(12) United States Patent
Taylor

(10) Patent No.: US 9,503,368 B2
(45) Date of Patent: Nov. 22, 2016

(54) ROUTING A CALL

(71) Applicant: Metaswitch Networks Ltd., Enfield (GB)

(72) Inventor: Martin Taylor, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 243 days.

(21) Appl. No.: 13/777,227

(22) Filed: Feb. 26, 2013

(65) Prior Publication Data

US 2013/0242775 A1 Sep. 19, 2013

Related U.S. Application Data

(60) Provisional application No. 61/603,874, filed on Feb. 27, 2012.

(51) Int. Cl.
*H04W 4/00* (2009.01)
*H04L 12/721* (2013.01)
(Continued)

(52) U.S. Cl.
CPC ............. *H04L 45/70* (2013.01); *H04L 45/306* (2013.01); *H04L 65/1006* (2013.01); *H04L 65/80* (2013.01); *H04M 3/2236* (2013.01); *H04M 7/0057* (2013.01)

(58) Field of Classification Search
CPC ... H04W 36/18; H04W 36/14; H04W 36/08; H04W 36/0011; H04W 36/24; H04W 36/30; H04W 40/02; H04W 40/12; H04W 40/125; H04W 80/04
See application file for complete search history.

(56) References Cited

U.S. PATENT DOCUMENTS 6,466,548 B1 10/2002 Fitzgerald
7,995,464 B1 8/2011 Croak et al.
(Continued)

FOREIGN PATENT DOCUMENTS

EP 0114463 A2 8/1984
JP 2008131346 A 6/2008
(Continued)

OTHER PUBLICATIONS

Polidoro, "Mobility Management in Next Generation Networks," PhD Thesis, University of Rome Tor Vergata, 2009 (http://dspace.uniroma2.it/dspace/bitstream/2108/1128/1/andrea_polidoro_tesi_dottorato.pdf).
(Continued)

*Primary Examiner* — Ian N Moore
*Assistant Examiner* — Phong La
(74) *Attorney, Agent, or Firm* — EIP US LLP

(57) ABSTRACT

A method of routing a call involving a call party in a telecommunications network via a selected media routing path of a plurality of different media routing paths is provided. The media routing paths communicate media data to and/or from at least one communication device associated with the call party. A call control system in the telecommunications network receives data derived from a media quality test procedure for a given media routing path. The media quality test procedure includes media test data being communicated via the given media routing path and the media test data being analysed. The call control system selects a preferred media routing path from the plurality of media routing paths for communicating media data associated with the call to and/or from one or more of the at least one communication devices associated with the call party on the basis of at least the received data.

13 Claims, 11 Drawing Sheets

(51) Int. Cl.
*H04L 29/06* (2006.01)
*H04M 3/22* (2006.01)
*H04M 7/00* (2006.01)
*H04L 12/725* (2013.01)

(56) References Cited

U.S. PATENT DOCUMENTS

| | | | |
|---|---|---|---|
| 8,743,709 B1 * | 6/2014 | Stegall | 370/252 |
| 2006/0154665 A1 | 7/2006 | Svensson et al. | |
| 2006/0187850 A1 * | 8/2006 | Ward et al. | 370/252 |
| 2006/0252444 A1 | 11/2006 | Ozugur | |
| 2006/0268828 A1 | 11/2006 | Yarlagadda | |
| 2007/0248079 A1 * | 10/2007 | Jayaram et al. | 370/352 |
| 2007/0274289 A1 * | 11/2007 | Buckley et al. | 370/351 |
| 2008/0037501 A1 * | 2/2008 | Ali et al. | 370/342 |
| 2008/0043699 A1 | 2/2008 | Park et al. | |
| 2008/0080480 A1 * | 4/2008 | Buckley et al. | 370/352 |
| 2008/0162637 A1 * | 7/2008 | Adamczyk et al. | 709/204 |
| 2009/0052399 A1 * | 2/2009 | Silver et al. | 370/331 |
| 2009/0097450 A1 * | 4/2009 | Wallis et al. | 370/331 |
| 2009/0111471 A1 * | 4/2009 | Li et al. | 455/437 |
| 2010/0074223 A1 * | 3/2010 | Mahdi | 370/331 |
| 2010/0177771 A1 * | 7/2010 | Buckley et al. | 370/352 |
| 2010/0177882 A1 * | 7/2010 | Taylor et al. | 379/207.02 |
| 2010/0309847 A1 * | 12/2010 | Bharadwaj | 370/328 |
| 2011/0071820 A1 * | 3/2011 | Kimura et al. | 704/200 |
| 2011/0255530 A1 * | 10/2011 | Chaturvedi et al. | 370/352 |

FOREIGN PATENT DOCUMENTS

| | | |
|---|---|---|
| WO | 03001330 A2 | 1/2003 |
| WO | 2006095262 A2 | 9/2006 |
| WO | 2007121561 A1 | 11/2007 |
| WO | 2008005274 A2 | 1/2008 |
| WO | 2008043008 A2 | 4/2008 |
| WO | 2010014872 A1 | 2/2010 |

OTHER PUBLICATIONS

James Ni, 3GPP IMS Centralized Services (ICS) Overview, Nov. 12, 2009, 63 pages.

Noldus et al, "Multi-access for the IMS network", Ericsson Review No. 2, 2008, pp. 81-86.

Prasan De Silva, "The Evolution of Voice in Mobile Networks", Sep. 21, 2009, 13 pages.

GSM Association, "IMS Service Centralization and Continuity Guidelines" Version 2.0, Dec. 28, 2011, 13 pages.

Fatema Sabeen Shaikh, "Intelligent Proactive Handover and QoS Management using TBVH in Heterogeneous Networks", Middlesex University, School of Engineering and Information Sciences, Jan. 2010, 243 pages.

Latif et al, "Quality of Service During Vertical Handover in 3G/4G Wireless Networks", Blekinge Institute of Technology, Feb. 2009, 68 pages.

* cited by examiner

ROUTING A CALL

CROSS-REFERENCE TO RELATED APPLICATIONS

This application claims priority to U.S. Patent Application Ser. No. 61/603,874, entitled "Routing a Call," filed on Feb. 27, 2012, the content of which is incorporated herein by reference in its entirety.

TECHNICAL FIELD

The present invention relates to routing a call.

BACKGROUND

Telephony users have long had to deal with a proliferation of user devices (sometimes referred to as 'user equipment' or 'endpoints') through which third parties may contact them. For example, a user might have a fixed-line (or 'wireline') telephony device for use at home, a further fixed-line telephony device for use in the office, and a mobile telephony device for use whilst on the move. Each type of telephony device has associated advantages; whilst a mobile telephony device provides the user with mobility, a fixed-line telephony device can provide more reliable communications with no battery recharge concerns.

Users may also have a number of different access technologies available through which their telephony devices may conduct communications. For example, one of the user's telephony devices may be equipped with a circuit-switched communication interface for conducting communications via suitable circuit-switched networks and the same or another of the user's telephony devices may be equipped with a packet-switched communication interface for communicating via suitable packet-switched networks.

A circuit-switched telephony device may comprise a fixed-line Plain Old Telephone Service (POTS) telephone equipped with a circuit-switched interface and communication client for conducting communications via a Public Switched Telephone Network (PSTN). A circuit-switched telephony user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched telephony devices have proliferated which may take the form of a fixed-line Internet Protocol (IP) telephone equipped with a fixed-line packet-switched interface and communication client for communicating via an Internet Protocol (IP) network, such as the Internet or an IP Private Branch Exchange (IP-PBX). Similarly, a user may conduct communications via a personal computer (PC) equipped with a packet-switched communication client for conducting communications over the Internet via a fixed-line Internet connection. A mobile packet-switched telephony device may take the form of a portable computing device, such as a laptop or tablet, equipped with a wireless packet-switched interface and communication client for communicating via an IP network, such as the Internet, using a WiFi™ or Bluetooth™ compliant wireless access point. A packet-switched communication client may conduct communications according to an Internet telephony protocol, commonly referred to as Voice over Internet Protocol (VoIP), with associated setup and/or control protocols such as the Session Initiation Protocol (SIP) or H.323.

Increasingly, telephony user devices are available that are equipped with multiple communication interfaces to facilitate communication via multiple access technologies. For example, a modern "smartphone" is typically equipped with a circuit-switched interface for communicating via a cellular network and a packet-switched interface for communicating via the Internet. Commonly, a smartphone may be equipped with several packet-switched interfaces, for example, a short-range radio interface, e.g. WiFi or Bluetooth™ compliant, and/or an interface for communication of packet data through a cellular network, such as 3rd Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. In cases such as this where a device is equipped with more than one communication client, the various clients deployed in that device are referred to as co-located. A suitable packet-switched communication client may be deployed on a user equipment prior to sale, or could be deployed subsequently through an application distribution portal such as the Apple® App Store$^{SM}$ or Android™ Market etc.

Taking an example of a smartphone that can conduct communications using WiFi access technology via a packet-switched network or cellular network access technology via a circuit-switched network, there are various reasons for wanting to connect phone calls involving the user over WiFi access, when available, rather than via cellular access. One reason is that a connection via WiFi may well offer better voice quality than via circuit-switched communications at any given location. Indeed, mobile users often suffer poor cellular coverage in locations where they often wish to use their cell phones and where WiFi coverage is good, including their home and their office. Another reason is that WiFi access may permit a better quality of user experience for a call by permitting the use of High Definition (HD) voice codecs and/or permitting the uplift of a voice call to include video. Yet another reason is that a user who is roaming outside their home network and is currently in a location with WiFi access may be able to make and receive calls via WiFi that do not attract additional roaming charges and, therefore, save the user money. Still another reason is that network operators may be able to benefit from reduced loading on their cellular Radio Access Network (RAN) infrastructure when subscribers connect voice calls over WiFi. One reason not to use WiFi access is because of possible data security concerns, particularly when using an unsecured or public WiFi connection.

With such a number of considerations to be taken into account when routing calls the user is sometimes left with a less than satisfactory experience when a call in which they are involved is routed in the network in an unsatisfactory manner.

It would therefore be desirable to provide improved routing of calls in a telecommunications network, particularly, but not exclusively, where this results in an improved user experience.

SUMMARY

In accordance with a first aspect of the invention, there is provided a method of routing a call involving a call party in a telecommunications network via a selected media routing path of a plurality of different media routing paths, each of the media routing paths being for communicating media data to and/or from at least one communication device associated with the call party, the method comprising, at a call control system in the telecommunications network:

receiving data derived from a media quality test procedure for a given media routing path, the media quality test procedure including media test data being communicated via the given media routing path and the media test data being analysed; and selecting a preferred media routing path from the plurality of media routing paths for communicating media data associated with the call to and/or from one or more of the at least one communication devices associated with the call party on the basis of at least the received data derived from the media quality test procedure.

In accordance with a second aspect of the invention, there is provided a method of controlling a communication device, in a telecommunications network comprising a plurality of different media routing paths, each of the media routing paths being for communicating media data associated with a call to and/or from one or more entities in the telecommunications network, the method comprising:

detecting one or more predetermined triggers prior to originating a call;

initiating a media quality test procedure for a given media routing path prior to originating the call, the media quality test procedure including media test data being communicated via the given media routing path and the media test data being analysed; and selecting a preferred media routing path from the plurality of media routing paths for communicating media data associated with the call at least in part on the basis of the media quality test procedure.

In accordance with a third aspect of the invention, there is provided a method of routing a call in a telecommunications network via a selected media routing path of a plurality of different media routing paths, the telecommunications network comprising at least one communication device associated with a call party involved in the call and at least one remote party device associated with a remote call party involved in the call, the method comprising, at one or more media quality monitoring entities intermediate the at least one communication device and the at least one remote party device:

performing at least part of a media quality monitoring procedure for a given media routing path via which media data associated with the call is being communicated, the media quality analysis procedure comprising:
analysing at least some of the media data being communicated via the given media path; and
determining a media quality associated with the analysed at least some of the media data; and selecting a preferred media routing path, from the plurality of media routing paths, for communicating media data associated with the call to and/or from one or more of the at least one communication devices associated with the call party at least in part on the basis of the media quality monitoring procedure.

Further features and advantages of the invention will become apparent from the following description of preferred embodiments of the invention, given by way of example only, which is made with reference to the accompanying drawings.

DETAILED DESCRIPTION

Figure 1:
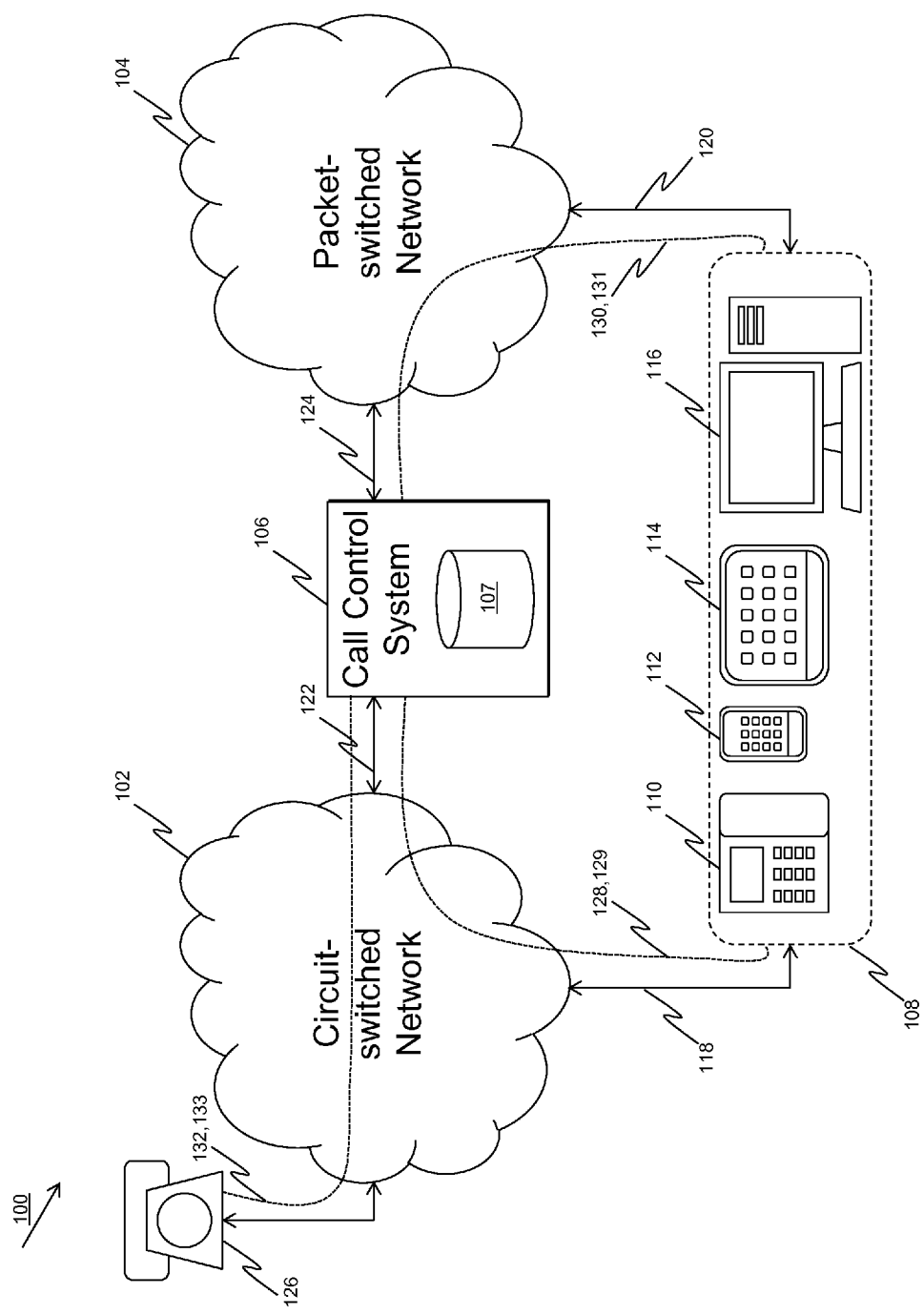
FIG. 1 shows an exemplary telecommunications network in which some embodiments may be employed.

In accordance with a first exemplary embodiment of the invention, there is provided a method of routing a call involving a call party in a telecommunications network via a selected media routing path of a plurality of different media routing paths. Each of the media routing paths is for communicating media data to and/or from at least one communication device associated with the call party. The method comprises, at a call control system in the telecommunications network: receiving data derived from a media quality test procedure for a given media routing path, the media quality test procedure including media test data being communicated via the given media routing path and the media test data being analysed; and selecting a preferred media routing path from the plurality of media routing paths for communicating media data associated with the call to and/or from one or more of the at least one communication devices associated with the call party on the basis of at least the received data derived from the media quality test procedure.

In some embodiments, the method comprises selecting the given media routing path from the plurality of media routing paths based at least on part on pre-existing preferred media routing path selection data.

In some embodiments, the method comprises performing at least part of the media quality test procedure.

In some embodiments, at least part of the media quality test procedure is performed by one or more given communication devices associated with the call party.

In some embodiments, the method comprises transmitting one or more messages that are operable to cause the given communication device to perform at least part of the media quality test procedure for the given media routing path.

In some embodiments, the one or more messages are operable to cause the given communication device to initiate the media quality test procedure.

In some embodiments, the method comprises transmitting the one or more messages via a given signalling path associated with the given media routing path.

In some embodiments, the one or more messages include a call setup request for the call.

In some embodiments, the method comprises transmitting the one or more messages in response to receiving an indication that a call setup request directed to the call party may be received.

In some embodiments, the method comprises transmitting the one or more messages in response to receiving a call setup request directed to the call party.

In some embodiments, the method comprises receiving one or more messages comprising the data derived from the media quality test procedure.

In some embodiments, the method comprises receiving the one or more messages via a given signalling path associated with the given media routing path.

In some embodiments, the one or more messages include a call setup response for the call.

In some embodiments, the data derived from the media quality test procedure indicates acceptance or rejection of a call setup request directed to the call party.

In some embodiments, the media quality test procedure comprises a media loopback test being performed.

In some embodiments, at least one of the plurality of media routing paths includes a cellular access network.

In some embodiments, at least one of the plurality of media routing paths includes a Wireless Local Area Network (WLAN).

In some embodiments, at least one of the plurality of media routing paths includes a circuit-switched network.

In some embodiments, at least one of the plurality of media routing paths includes a packet-switched network.

In some embodiments, the call control system includes one or more entities located in an Internet Protocol Multimedia Subsystem (IMS) network.

In some embodiments, the given media routing path includes one or more intermediate nodes.

In some embodiments, at least part of the media quality test procedure is performed by at least one of the one or more intermediate nodes.

In accordance with a second exemplary embodiment of the invention, there is provided a call control system for routing a call involving a call party in a telecommunications network via a selected media routing path of a plurality of different media routing paths. Each of the media routing paths is for communicating media data to and/or from at least one communication device associated with the call party. The call control system is configured to: receive data derived from a media quality test procedure for a given media routing path, the media quality test procedure including media test data being communicated via the given media routing path and the media test data being analysed; and select a preferred media routing path from the plurality of media routing paths for communicating media data associated with the call to and/or from one or more of the at least one communication devices associated with the call party on the basis of at least the received data derived from the media quality test procedure.

In accordance with a third exemplary embodiment of the invention, there is provided a computer program product comprising a non-transitory computer-readable storage medium having computer readable instructions stored thereon. The computer readable instructions are executable by a computerized device to cause the computerized device to perform a method of routing a call involving a call party in a telecommunications network via a selected media routing path of a plurality of different media routing paths. Each of the media routing paths is for communicating media data to and/or from at least one communication device associated with the call party. The method comprises, at a call control system in the telecommunications network: receiving data derived from a media quality test procedure for a given media routing path, the media quality test procedure including media test data being communicated via the given media routing path and the media test data being analysed; and selecting a preferred media routing path from the plurality of media routing paths for communicating media data associated with the call to and/or from one or more of the at least one communication devices associated with the call party on the basis of at least the received data derived from the media quality test procedure.

In accordance with a fourth exemplary embodiment of the invention, there is provided a method of controlling a communication device, in a telecommunications network comprising at least one media routing path for communicating media data to and/or from one or more entities in the telecommunications network. The method comprises: receiving one or more messages comprising one or more predetermined parameters; performing at least part of a media quality test procedure for a given media routing path at least in part on the basis of recognising the one or more predetermined parameters, the media quality test procedure including media test data being communicated via the given media routing path and the media test data being analysed; and transmitting data derived from the media quality test procedure for the given media routing path.

In some embodiments, the telecommunications network comprises a plurality of media routing paths for communicating media data to and/or from the one or more entities in the telecommunications network, and the method comprises selecting a preferred media routing path from the plurality of media routing paths for communicating media data to and/or from the telecommunications network at least in part on the basis of the media quality test procedure.

In some embodiments, the method comprises transmitting media data associated with the call via the preferred media routing path.

In some embodiments, the method comprises selecting the given media routing path from the plurality of media routing paths based at least on part on pre-existing preferred media routing path selection data.

In some embodiments, the method comprises initiating the media quality test procedure at least in part on the basis of recognising the one or more predetermined parameters.

In some embodiments, the method comprises receiving the one or more messages via a given signalling path associated with the given media routing path.

In some embodiments, the one or more received messages includes a call setup request for a call involving a call party associated with the communication device.

In some embodiments, the method comprises activating an alert associated with an incoming call dependent on a result of the media quality test procedure.

In some embodiments, the method comprises transmitting one or more messages comprising the data derived from the media quality test procedure via a given signalling path associated with the given media routing path.

In some embodiments, the one or more transmitted messages include a call setup response for a call involving a call party associated with the communication device.

In some embodiments, the data derived from the media quality test procedure indicates acceptance or rejection of a call setup request directed to a call party associated with the communication device.

In some embodiments, said performing at least part of a media quality test procedure for the given media routing path comprises performing a media loopback test for the given media routing path.

In some embodiments, the method comprises performing said at least part of the media quality test with an entity in the telecommunications network that is different from an entity from which the one or more received messages originate.

In accordance with a fifth exemplary embodiment of the invention, there is provided a communication device, in a telecommunications network comprising at least one media routing path for communicating media data to and/or from one or more entities in the telecommunications network. The communication device is configured to: receive one or more messages comprising one or more predetermined parameters; perform at least part of a media quality test procedure for a given media routing path at least in part on the basis of recognising the one or more predetermined parameters, the media quality test procedure including media test data being communicated via the given media routing path and the media test data being analysed; and transmit data derived from the media quality test procedure for the given media routing path.

In accordance with a sixth exemplary embodiment of the invention, there is provided a computer program product comprising a non-transitory computer-readable storage medium having computer readable instructions stored thereon. The computer readable instructions are executable by a computerized device to cause the computerized device to perform a method of controlling a communication device, in a telecommunications network comprising at least one media routing path for communicating media data to and/or from one or more entities in the telecommunications network. The method comprises: receiving one or more messages comprising one or more predetermined parameters; performing at least part of a media quality test procedure for a given media routing path at least in part on the basis of recognising the one or more predetermined parameters, the media quality test procedure including media test data being communicated via the given media routing path and the media test data being analysed; and transmitting data derived from the media quality test procedure for the given media routing path.

In accordance with a seventh exemplary embodiment of the invention, there is provided a method of controlling a communication device, in a telecommunications network comprising a plurality of different media routing paths. Each of the media routing paths is for communicating media data associated with a call to and/or from one or more entities in the telecommunications network. The method comprises: detecting one or more predetermined triggers prior to originating a call; initiating a media quality test procedure for a given media routing path prior to originating the call, the media quality test procedure including media test data being communicated via the given media routing path and the media test data being analysed; and selecting a preferred media routing path from the plurality of media routing paths for communicating media data associated with the call at least in part on the basis of the media quality test procedure.

In some embodiments, the method comprises initiating the media quality test procedure in response to detecting the one or more predetermined triggers.

In some embodiments, the one or more predetermined triggers comprises detecting expiry of a media quality test time period.

In some embodiments, the one or more predetermined triggers are associated with originating a call.

In some embodiments, the one or more predetermined triggers include detecting an attempt to originate the call.

In some embodiments, the one or more predetermined triggers include detecting activity that may lead to a call origination attempt.

In accordance with an eighth exemplary embodiment of the invention, there is provided a communication device, in a telecommunications network comprising a plurality of different media routing paths. Each of the media routing paths is for communicating media data associated with a call to and/or from one or more entities in the telecommunications network. The communication device is configured to: detect one or more predetermined triggers prior to originating a call; initiate a media quality test procedure for a given media routing path prior to originating the call, the media quality test procedure including media test data being communicated via the given media routing path and the media test data being analysed; and select a preferred media routing path from the plurality of media routing paths for communicating media data associated with the call at least in part on the basis of the media quality test procedure.

In accordance with a ninth exemplary embodiment of the invention, there is provided a computer program product comprising a non-transitory computer-readable storage medium having computer readable instructions stored thereon. The computer readable instructions are executable by a computerized device to cause the computerized device to perform a method of controlling a communication device, in a telecommunications network comprising a plurality of different media routing paths. Each of the media routing paths is for communicating media data associated with a call to and/or from one or more entities in the telecommunications network. The method comprises: detecting one or more predetermined triggers prior to originating a call; initiating a media quality test procedure for a given media routing path prior to originating the call, the media quality test procedure including media test data being communicated via the given media routing path and the media test data being analysed; and selecting a preferred media routing path from the plurality of media routing paths for communicating media data associated with the call at least in part on the basis of the media quality test procedure.

In accordance with a tenth exemplary embodiment of the invention, there is provided a method of routing a call in a telecommunications network via a selected media routing path of a plurality of different media routing paths. The telecommunications network comprises at least one communication device associated with a call party involved in the call and at least one remote party device associated with a remote call party involved in the call. The method comprises, at one or more media quality monitoring entities intermediate the at least one communication device and the at least one remote party device: performing at least part of a media quality monitoring procedure for a given media routing path via which media data associated with the call is being communicated; and transmitting data derived from the media quality test procedure for a given media routing path to facilitate selection of a preferred media routing path, from the plurality of media routing paths, for communicating media data associated with the call to and/or from one or more of the at least one communication devices associated with the call party. The media quality analysis procedure comprises: analysing at least some of the media data being communicated via the given media path; and determining a media quality associated with the analysed at least some of the media data.

In some embodiments, the method comprises relaying media data associated with the call to the at least one communication device via the given media routing path.

In some embodiments, the method comprises relaying media data associated with the call from the at least one communication device via the given media routing path.

In some embodiments, the method comprises analysing at least some media data associated with the call that is being communicated to the at least one communication device via the given media routing path.

In some embodiments, the method comprises analysing at least some media data associated with the call that is being communicated from the at least one communication device via the given media routing path.

In some embodiments, the method comprises transmitting the data derived from the media quality test procedure in response to determining that the media quality associated with the analysed at least some of the media data is below a predetermined threshold quality level.

In some embodiments, the method comprises transmitting the data derived from the media quality test procedure to a call control system, the call control system being configured to perform said selection of the preferred media routing path.

In accordance with an eleventh exemplary embodiment of the invention, there is provided a system for routing a call in a telecommunications network via a selected media routing path of a plurality of different media routing paths. The telecommunications network comprises at least one communication device associated with a call party involved in the call and at least one remote party device associated with a remote call party involved in the call. The system comprises one or more media quality monitoring entities intermediate the at least one communication device and the at least one remote party device. The one or more media quality monitoring entities are configured to perform at least part of a media quality monitoring procedure for a given media routing path via which media data associated with the call is being communicated, the media quality analysis procedure comprising: analysing at least some of the media data being communicated via the given media path; and determining a media quality associated with the analysed at least some of the media data. The one or more media quality monitoring entities are also configured to transmit data derived from the media quality test procedure for a given media routing path to facilitate selection of a preferred media routing path, from the plurality of media routing paths, for communicating media data associated with the call to and/or from one or more of the at least one communication devices associated with the call party.

In accordance with a twelfth exemplary embodiment of the invention, there is provided a computer program product comprising a non-transitory computer-readable storage medium having computer readable instructions stored thereon. The computer readable instructions are executable by a computerized device to cause the computerized device to perform a method of routing a call in a telecommunications network via a selected media routing path of a plurality of different media routing paths. The telecommunications network comprises at least one communication device associated with a call party involved in the call and at least one remote party device associated with a remote call party involved in the call. The method comprises, at one or more media quality monitoring entities intermediate the at least one communication device and the at least one remote party device: performing at least part of a media quality monitoring procedure for a given media routing path via which media data associated with the call is being communicated; and transmitting data derived from the media quality test procedure for a given media routing path to facilitate selection of a preferred media routing path, from the plurality of media routing paths, for communicating media data associated with the call to and/or from one or more of the at least one communication devices associated with the call party. The media quality analysis procedure comprises: analysing at least some of the media data being communicated via the given media path; and determining a media quality associated with the analysed at least some of the media data.

In accordance with a thirteenth exemplary embodiment of the invention, there is provided a method of routing a call in a telecommunications network via a selected media routing path of a plurality of different media routing paths. The telecommunications network comprises at least one communication device associated with a call party involved in the call and at least one remote party device associated with a remote call party involved in the call. The method comprises, at one or more media quality monitoring entities intermediate the at least one communication device and the at least one remote party device: performing at least part of a media quality monitoring procedure for a given media routing path via which media data associated with the call is being communicated; and selecting a preferred media routing path, from the plurality of media routing paths, for communicating media data associated with the call to and/or from one or more of the at least one communication devices associated with the call party at least in part on the basis of the media quality monitoring procedure. The media quality analysis procedure comprises: analysing at least some of the media data being communicated via the given media path; and determining a media quality associated with the analysed at least some of the media data.

In some embodiments, the method comprises relaying media data associated with the call to the at least one communication device via the given media routing path.

In some embodiments, the method comprises relaying media data associated with the call from the at least one communication device via the given media routing path.

In some embodiments, the method comprises analysing at least some media data associated with the call that is being communicated to the at least one communication device via the given media routing path.

In some embodiments, the method comprises analysing at least some media data associated with the call that is being communicated from the at least one communication device via the given media routing path.

In accordance with a fourteenth exemplary embodiment of the invention, there is provided a system for routing a call in a telecommunications network via a selected media routing path of a plurality of different media routing paths, the telecommunications network comprising at least one communication device associated with a call party involved in the call and at least one remote party device associated with a remote call party involved in the call. The system comprises one or more media quality monitoring entities intermediate the at least one communication device and the at least one remote party device. The one or more media quality monitoring entities are configured to: perform at least part of a media quality monitoring procedure for a given media routing path via which media data associated with the call is being communicated; and select of a preferred media routing path, from the plurality of media routing paths, for communicating media data associated with the call to and/or from one or more of the at least one communication devices associated with the call party at least in part on the basis of the media quality monitoring procedure. The media quality analysis procedure comprises: analysing at least some of the media data being communicated via the given media path; and determining a media quality associated with the analysed at least some of the media data.

In accordance with a fifteenth exemplary embodiment of the invention, there is provided a computer program product comprising a non-transitory computer-readable storage medium having computer readable instructions stored thereon. The computer readable instructions are executable by a computerized device to cause the computerized device to perform a method of routing a call in a telecommunications network via a selected media routing path of a plurality of different media routing paths. The telecommunications network comprises at least one communication device associated with a call party involved in the call and at least one remote party device associated with a remote call party involved in the call. The method comprises, at one or more media quality monitoring entities intermediate the at least one communication device and the at least one remote party device: performing at least part of a media quality monitoring procedure for a given media routing path via which media data associated with the call is being communicated; and selecting a preferred media routing path, from the plurality of media routing paths, for communicating media data associated with the call to and/or from one or more of the at least one communication devices associated with the call party at least in part on the basis of the media quality monitoring procedure. The media quality analysis procedure comprises: analysing at least some of the media data being communicated via the given media path; and determining a media quality associated with the analysed at least some of the media data.

FIG. 1 shows an exemplary telecommunications network 100 in which some embodiments may be employed. Telecommunications network 100 includes a circuit-switched telecommunications network part 102, a packet-switched network part 104 and may include other network parts (not shown).

The telecommunications network 100 includes a call control system 106. The call control system 106 is responsible for controlling calls in the telecommunications network. In some embodiments, the circuit-switched network 102 and the packet-switched network 104 are configured to route all calls involving a given user via the call control system 106.

The call control system 106 may comprise a media gateway controller, service platform, call agent, application server or softswitch and may perform other functions typically associated with such entities. Although depicted in FIG. 1 as a single network entity located between the circuit-switched network 102 and the packet-switched network 104, the call control system 106 may comprise a plurality of network elements, with some or all such elements being located within the circuit-switched network 102 and/or the packet-switched network 104 and/or one or more other networks (not shown). In some embodiments, the call control system 106 includes one or more entities located in an Internet Protocol Multimedia Subsystem (IMS) network. In some embodiments, a client-shared telephony service is hosted and controlled by the call control system 106, as will be described in more detail below.

The call control system 106 comprises a user database 107 for storing data associated with users of the client-shared telephony service. In some embodiments, user database 107 includes a list of identifiers for the communication clients equipped to various communication devices 108 associated with a given user. User database 107 may also store a user profile associated with each user, which contains a number of user configurable preferences, such as call routing preferences. The user database 107 may store pre-existing preferred media routing path selection data, as will be described in more detail below.

The user of the telephony service provided by the telecommunications network 100 has one or more communication devices 108 through which they conduct communications via the telephony service. The various communication devices 108 through which a user can conduct communications via the service are considered to be associated with that user. The user's associated communication devices may include, for example, a desk phone 110, a mobile (or 'cellular') telephone 112, a tablet device 114 and/or a personal computer 116.

Each of the user's communication devices 108 is equipped with one or more interfaces and one or more communication clients for conducting communications in the telecommunications network 100. Communication devices 108 equipped with a circuit-switched interface and communication client are adapted to conduct communications in the telecommunications network 100 via link 118 with the circuit-switched network 102. The circuit-switched interface may comprise a landline PSTN interface in the case of a fixed-line device such as desk phone 110, or a cellular radio telephony interface in the case of a mobile device such as mobile telephone 112. Communication devices equipped with a packet-switched interface and communications client are adapted to conduct communications in telecommunications network via link 120 with packet-switched network 104. This packet-switched interface could comprise a wired interface to the Internet in the case of a fixed line device such as personal computer 116, or a wireless interface (e.g. WiFi, Bluetooth, 3G-LTE, WiMax, etc.) to the Internet in the case of a mobile device such as tablet 114. The packet-switched interface may comprise an Ethernet port.

To avoid confusing calling parties with identifiers such as telephone dialling numbers for each of the various communication clients of a user, a one-telephone dialling number telephony service allows the user to publish a single telephone dialling number on which they can be contacted. Using a simultaneous ring service, when the single telephone dialling number is called, more than one of the user's communication clients will ring simultaneously. The user is then able to answer the call using the communication client of his choosing.

Each of the communication clients equipped to the various communication devices 108 associated with a given user is likely to have intermittent connectivity to call control system 106, and therefore are only intermittently able to conduct communications. This may be due to the devices being powered off for limited periods. Alternatively this may be due to mobility when connecting to telecommunications network 100 via a wireless interface, for example by moving in and out of range of the various cells and access points or interference from other wireless communication equipment etc. Further, there could be temporary problems with local or centralised network infrastructure in telecommunications network 100, such as downtime due to maintenance work or power outages.

From the perspective of call control system 106, the communication clients on the various communication devices 108 associated with a given user can be considered to have intermittent availability. In some embodiments, user database 107 is further configured to store the availability of any clients associated with a given user. In some embodiments, this is achieved by configuring each communication client to periodically send a message (referred to herein as a heartbeat) to call control system 106. If such a heartbeat message is not received by call control system 106, that client can be considered unavailable until a subsequent message is successfully received. Alternatively, in other embodiments, call control system 106 is adapted to periodically "poll" each communication client to probe for its availability using a request response protocol.

As explained above, the circuit-switched network 102 and the packet-switched network 104 may be configured to route all calls involving the user, for example in which the user is a called or calling party, via the call control system 106. A call involving the user could be routed between the circuit-switched network 102 and the call control system 106 via a link 122 so that call control system 106 can control the call. The link 122 may, for example, comprise a Session Initiation Protocol (SIP) trunk, or other high capacity communications link. Similarly, a call involving the user could be routed between the packet-switched network 104 and the call control system 106 via a link 124 so that the call control system 106 can control the call.

The link 122 and/or link 124 may comprise one or more gateway or session border controller entities (not shown) which carry out conversion between the various protocols and data formats used to transfer media data and signalling data in the different networks making up the telecommunications network 100. For example, a media gateway (not shown) may convert between the different protocols of media data passing between the circuit-switched network 102 and the packet-switched network 104, such as packetised Voice over Internet Protocol (VoIP) data into Time-Division-Multiplexing (TDM) voice data and vice versa. A signalling gateway (not shown) may convert between the different protocols of signalling information passing between the circuit-switched network 102 and the packet-switched network 104, such as SIP, Signalling System 7 (SS7), Integrated Services Digital Network User Part (ISUP), American National Standards Institute (ANSI)-41, Mobile Application Part (MAP) formats, etc, as appropriate.

Some communication devices 108 may be equipped with a plurality of communications clients. For example, in addition to having a circuit-switched communication client and a circuit-switched interface, a communication device 108, such as a mobile telephone 112, may also be equipped with one or more packet-switched communications clients and one or more packet-switched interfaces for conducting communications via the packet-switched network 104 via the link 120. In this case, the multiple communication clients provided on the communication device 108 are referred to as 'co-located' communication clients; multiple communication clients on a single communication device 108. In some embodiments, the call control system 106 hosts and controls a client-shared telephony service, in which the user has multiple communication clients that share a common dialling number. In such embodiments, the user can use the shared dialling number for communications involving any of their multiple communication clients.

FIG. 1 also shows a remote party device 126, such as a POTS telephone or mobile cellular telephone, that is associated with a remote party and that communicates in the telecommunications network 100 via the circuit-switched network 102. Although the remote party device 126 is described as communicating via the circuit-switched network 102, the remote party device 126 may, instead or additionally, communicate via the packet-switched network 104 and/or one or more other networks not shown).

The telecommunication network 100 includes a plurality of media routing paths 128, 130, 132 via which media data may be communicated. Three such media routing paths 128, 130, 132 are depicted in FIG. 1. A first media routing path 128, generally referred to herein as a 'circuit-switched media routing path', is formed between the call control system 106 and the communication device(s) 108 via the circuit-switched network 102 and links 118 and 122. A second media routing path 130, generally referred to herein as a 'packet-switched media routing path', is formed between the call control system 106 and the communication device(s) 108 via the packet-switched network 104 and links 120 and 124. A third media routing path 132 is formed between the call control system 106 and the remote party device 126 via the circuit-switched network 102 and the link 122. In some embodiments, at least one of the plurality of media routing paths, for example, the circuit-switched media routing path 128 or the packet-switched media routing path 130, includes a cellular access network. In some embodiments, at least one of the plurality of media routing paths, for example the packet-switched media routing path 130, includes a Wireless Local Area Network (WLAN). In some embodiments, at least one of the plurality of media routing paths includes a circuit-switched network, such as circuit-switched network 102. In some embodiments, at least one of the plurality of media routing paths includes a packet-switched network, such as packet-switched network 104.

The telecommunication network 100 also includes a plurality of signalling paths 129, 131, 133 via which signalling data associated with a call may be communicated. Three such signalling paths 129, 131, 133 are depicted in FIG. 1 and are associated with media routing paths 128, 130, 132 respectively. A first signalling path 129, generally referred to herein as a 'circuit-switched signalling path', is formed between the call control system 106 and the communication device(s) 108 via the circuit-switched network 102 and links 118 and 122. A second signalling path 131, generally referred to herein as a 'packet-switched signalling path', is formed between the call control system 106 and the communication device(s) 108 via the packet-switched network 104 and links 120 and 124. A third signalling path 133 is formed between the call control system 106 and the remote party device 126 via the circuit-switched network 102 and link 122.

Although media routing and signalling paths 128 and 129, 130 and 131, 132 and 133 are depicted in FIG. 1 as being identical, it will be appreciated that, in reality, although they may be considered to be associated with each other, signalling data and media data for a given call may take different routes through the telecommunications network 100, particularly where one or more entities is responsible for handling the signalling data for the given call and one or more different entities is responsible for handling the media data for the given call.

There are various considerations that may be taken into account when selecting a media routing path for a call. Some considerations are discussed below where the packet-switched media routing path 130 includes a wireless local area network (WLAN) connection using WiFi to a communication device 108 associated with the user. At least some of these considerations take into account the likely effect on user experience.

When the communication device 108 is in an area of WiFi coverage, there are good reasons for wanting to route media associated calls using the WiFi connection over the packet-switched media routing path 130 rather than via the circuit-switched media routing path 128. As explained above, one reason is that the WiFi connection to the packet-switched network 104 may offer better voice quality than a cellular connection (for example) to the cellular network 102 at any given location. The user may suffer poor cellular coverage in locations where they often wish to use their communication device 108 and where WiFi coverage is good, including their home and their office. Another reason is that the packet-switched media routing path 130 may permit a better quality of user experience for a given call by permitting the use of HD voice codecs and/or enhanced call services and/or permitting the uplift of a pure voice call to include video. Another reason is that a user who is roaming outside their home network and who is currently in a location with WiFi access may be able to make and receive calls via WiFi through the packet-switched network 104 that may not attract additional roaming charges and, therefore, save the user money. Another reason is that network operators may be able to benefit from reduced loading on their cellular RAN infrastructure when subscribers connect voice calls over WiFi, or otherwise, over the packet-switched media routing path 130.

The ability to connect voice calls, or other communication sessions such as video calls, to a communication device 108 over WiFi access when it is available is generally referred to herein as "WiFi Offload". In some embodiments, calls are connected over WiFi only if the WiFi connection supports media communication with sufficient quality; mere availability of a WiFi connection may not be sufficient for WiFi offload. Although reference is made herein to "WiFi", "WiFi access", "WiFi connectivity" and the like, it will be appreciated that other access technologies are envisaged depending upon the context.

In some embodiments, WiFi offload may be implemented by making use of a packet-switched communication client, such as a SIP client, installed in the communication device 108, which registers with a packet-based service, such as a SIP-based service, in the telecommunications network 100. In this case, a special function exists in the telecommunications network 100 that determines which path to route any given terminating call over, or at least which path to select as a preferred path. In some embodiments, the special function is provided by the call control system 106.

Selecting, or prioritising, a path over which to terminate a call is generally referred to herein as "Terminating Access Domain Selection" (TADS).

One approach to TADS is to determine whether there is a current SIP registration for the communication device 108. If a SIP registration exists, and if user preference or service provider policy indicates, for example in pre-existing preferred media routing path selection data, that calls should be terminated over WiFi whenever possible, then the call control system 106 may attempt to deliver the call using WiFi over the packet-switched signalling path 131. SIP registrations typically have reasonably long time-outs, so it is possible that the user has moved out of WiFi coverage since the most recent successful registration. The call control system 106 learns whether the communication device 108 currently has WiFi coverage if and when it sends a SIP INVITE to the communication device 108. If no response is received within a given time following several attempts, then the call control system 106 can conclude that WiFi access is not available and may attempt to send the call via a different path, such as via the circuit-switched signalling path 129 or via a second packet-switched signalling path (not shown) that does not include the unavailable WiFi connection. In this approach, the call control system 106 may not know in advance whether the connectivity between the communication device 108 and the packet-switched network 104 is capable of delivering a voice media stream with acceptable quality. Network congestion, poor WiFi signal strength or other factor could compromise voice quality. The communication device 108 could attempt to communicate with the call control system 106 to indicate current WiFi signal strength, but this may not be a good predictor of acceptable voice quality because of other factors such as network congestion. Delivering the call with less than acceptable quality may detract significantly from user experience.

Another approach to TADS is for the call control system 106 to cooperate with the communication device 108 to determine the quality of the packet-switched media routing path 130, for example by means of the communication device 108 initiating a test loopback call to test the media quality associated with the packet-switched media routing path 130, before deciding whether to deliver the call to the user over WiFi via the packet-switched paths 130, 131 or via the circuit-switched paths 128, 129.

Loopback test activity on terminating calls adds to the post-dial delay experienced by the calling party, and this therefore has some negative impact on overall user experience. This is balanced against the improvement in user experience achieved by connecting the call via the path that is most likely to provide an acceptable level of voice quality. However, it may be possible to carry out the media quality test whenever a remote party performs activity on their remote party device 126 that is likely to lead to a call origination to the user. For example, the test could be performed if the remote party opens a "phone" or a "contacts" entry in which the user is identified and/or by taking a more positive action in relation to originating a call to the user. For example, depending upon the type of remote part device 126, the remote party device 126 may transmit a capability request, for example in a SIP OPTIONS message, for the user prior to initiating a call to the user. The call control system 106 may determine that it is likely that the call may be made to the user and may initiate the test on the basis of receiving the capability request. By the time the remote party has initiated a call to the user, the test may already have been completed and the results available to perform TADS.

Whereas TADS described above relates to selecting, or prioritising, a path over which to terminate a call, selecting, or prioritising, a path over which to originate a call is generally referred to herein as "Originating Access Domain Selection" (OADS).

OADS is may be handled locally on a communication device 108 based on some combination of user preference, network operator policy and per-call prompting. One approach to OADS is that if the user has indicated a preference to originate all calls over WiFi, then whenever WiFi connectivity is available the communication device 108 will attempt to originate all calls over WiFi. Before a user can originate calls over WiFi, the communication device 108 registers with a SIP service provided by the telecommunications network 100, and the communication device 108 can infer from the success of a registration attempt over WiFi that it does indeed have connectivity with the packet-switched network 104. However the communication device 108 may not know in advance whether the quality of the connection that it has with the packet-switched network 104 is sufficiently good to support a voice call. For example, the WiFi signal may be extremely weak or the bandwidth available on the uplink from the WiFi base station to the packet-switched network 104 may be heavily occupied by a large data transfer. In either of these cases, a voice call over WiFi access may be subject to severe and perhaps unacceptable degradation of quality. The communication device 108 may be able to determine the relative strength of the WiFi signal but may not be able to determine in advance whether the WiFi connection will support a sufficiently good quality voice media stream, even if the signal level appears to be good. Furthermore, the communication device 108 may be unable to determine whether the uplink is congested. Originating a call with less than acceptable quality may detract significantly from user experience.

Another approach to OADS is for the communication device 108 to (choose to) test the quality of voice media over the WiFi access network before attempting to originate a call over WiFi.

Performing such a quality test after the user has attempted to initiate an originating call may not result in an acceptable user experience, since it will delay the connection of the call by several seconds. However, it may be possible to carry out the test whenever the user performs activity on the communication device 108 that is likely to lead to a call origination. For example, the test could be performed if the user opens a "phone" or a "contacts" application on the communication device 108. By the time the user selects a contact to call or enters a phone number, the test may already have been completed and the results available to perform OADS. In some embodiments, the communication device 108 may perform a media quality test periodically or intermittently, for example by detecting the expiry of media quality test time period, in other words a time period at which the media quality associated with a given media routing path is tested.

Whereas TADS and OADS described above generally (although not necessarily exclusively) relate to selecting, or prioritising, a path over which to terminate and originate a call that has not yet been established, selecting, or prioritising, a path over which to route a call that is already in progress is generally referred to herein as "Voice Call Continuity" (VCC).

VCC is concerned with transitioning an existing established voice call from one path to another, either because the call is currently connected over a non-preferred path and the preferred path has become available (for example because the user has walked into an area of WiFi coverage which means that an existing call over the circuit-switched network 102 may be able to be transitioned to the packet-switched network 104) or because the call is connected over the preferred path, but the quality of the call has become degraded (for example because the user has walked out of an area of WiFi coverage). VCC may be performed by the call control system 106, based on communication with the communication device 108.

One approach to VCC assumes that that the purpose of WiFi offload is to connect voice calls over WiFi access whenever possible.

When a user who is currently engaged on a call connected via the circuit-switched network 102 enters an area of WiFi, the communication device 108 registers with a SIP service in the telecommunications network 100. The call control system 106 may be made aware of this registration if the call control system 106 incorporates the SIP registrar function, or if the call control 106 system receives notification of SIP registration from a separate SIP registrar function, and this may trigger the call control system 106 to switch the call from the circuit-switched network 102 to the packet-switched network 104. Alternatively, the communication device 108, having successfully registered, could initiate the switching of the call if it is aware that a call over the circuit-switched network 102 is currently in progress. This may or may not be possible, depending on the Operating System (OS) platform of the communication device 108. Either way, neither the call control system 106 nor the communication device 108 may know in advance whether the packet-switched network 104 will be capable of supporting the call with sufficient quality. Therefore there is a risk that transitioning the call from the circuit-switched network 102 to the packet-switched network 104 over WiFi could cause serious degradation of call quality and impact upon user experience.

Similarly, when a user who is currently engaged on a call connected via WiFi access leaves the area of WiFi coverage, the quality of voice media will degrade progressively until the media flow fails entirely. The communication device 108 could detect progressive degradation of the media and signal to the call control system 106 that the call should be transitioned to the circuit-switched network 102. This may still not provide a good user experience because WiFi coverage may be lost before this signalling can take place, and because the communication device 108 may have no visibility of the quality of the media it is sending upstream as perceived by the other party in the call.

Another approach to VCC is to provide the user with manual controls that enable a call to be transitioned from the circuit-switched network 102 to the packet-switched network 104 or vice versa on demand. The user typically knows when they are entering or leaving an area of WiFi coverage, and can make the decision to transition the call based on currently perceived quality of the media. While this solution may be satisfactory to some users, others will expect the service to provide automatic transition instead of, or perhaps in addition to, manually-controlled VCC.

The above-discussed approaches to VCC may not provide sufficiently high user experience.

Another approach to VCC is that the communication device 108 tests the media quality of the WiFi access network, for example by establishing a test media loopback connection, before deciding whether to indicate to the call control system 106 that it wishes to switch the call to the WiFi access network (or before deciding to switch the call to the WiFi access network itself depending on its capabilities).

When a user who is currently engaged on a call that is connected via the WiFi access domain moves away from the centre of the WiFi hot spot, the quality of the media experienced by both parties on the call will progressively degrade until the media connection is effectively completely lost. In order to deliver an acceptable user experience, the call control system 106 causes the call to switch to the circuit-switched network 102 before the level of degradation becomes unacceptable. The communication device 108 may monitor the quality of inbound media and indicate its desire to switch to the circuit-switched network 102 to the call control system 106 either by out-of-band (e.g. HTTP) means or by some specific use of SIP signalling. There are some shortcomings with this approach alone. First, the communication device 108 does not take into account the quality of the upstream media that is heard by the other party, which may well be degraded to a far greater degree that the downstream media as seen by the communication device 108. Secondly, the communication device 108 may temporarily lose data connectivity such that any indication sent to the call control system 106 to request the call control system 106 to switch the call to the circuit-switched network 104 may be lost or seriously delayed.

As such, the call control system 106, which is typically relaying both upstream and downstream media streams, may monitor the media quality and transition the call in the event that media in either or both directions becomes unacceptable. This may be done instead of, or in addition to, the communication device 108 monitoring the quality of downstream media. The call control system 106 may be able to monitor the quality of upstream media by observing the packet loss, jitter and delay of upstream RTP packets, and may be able to monitor indirectly the quality of the downstream media on the WiFi access network by monitoring RTCP reports from the communication device 108. When the call control system 106 detects media quality in either direction degrading beyond a pre-set threshold condition, the call control system 106 may switch the call to the circuit-switched network 102.

In some embodiments, the call control system 106 may transmit a notification to the communication device 108 prior to switching the call to prompt the user to confirm whether or not they would like the call to be switched. On some occasions, the user may not wish to switch the call, for example if this would mean connecting the call over an 'open' WiFi connection in a public place, albeit a connection that may be of sufficiently high quality for the voice call to be transitioned. The communication device 108 may then activate an alert, such as a visual and/or audible alert to inform the user of the possibility of, in this case, WiFi offload.

Various embodiments that will be discussed in more detail below relate, at least to some extent, to improving user experience in the context of VCC.

Figure 2:
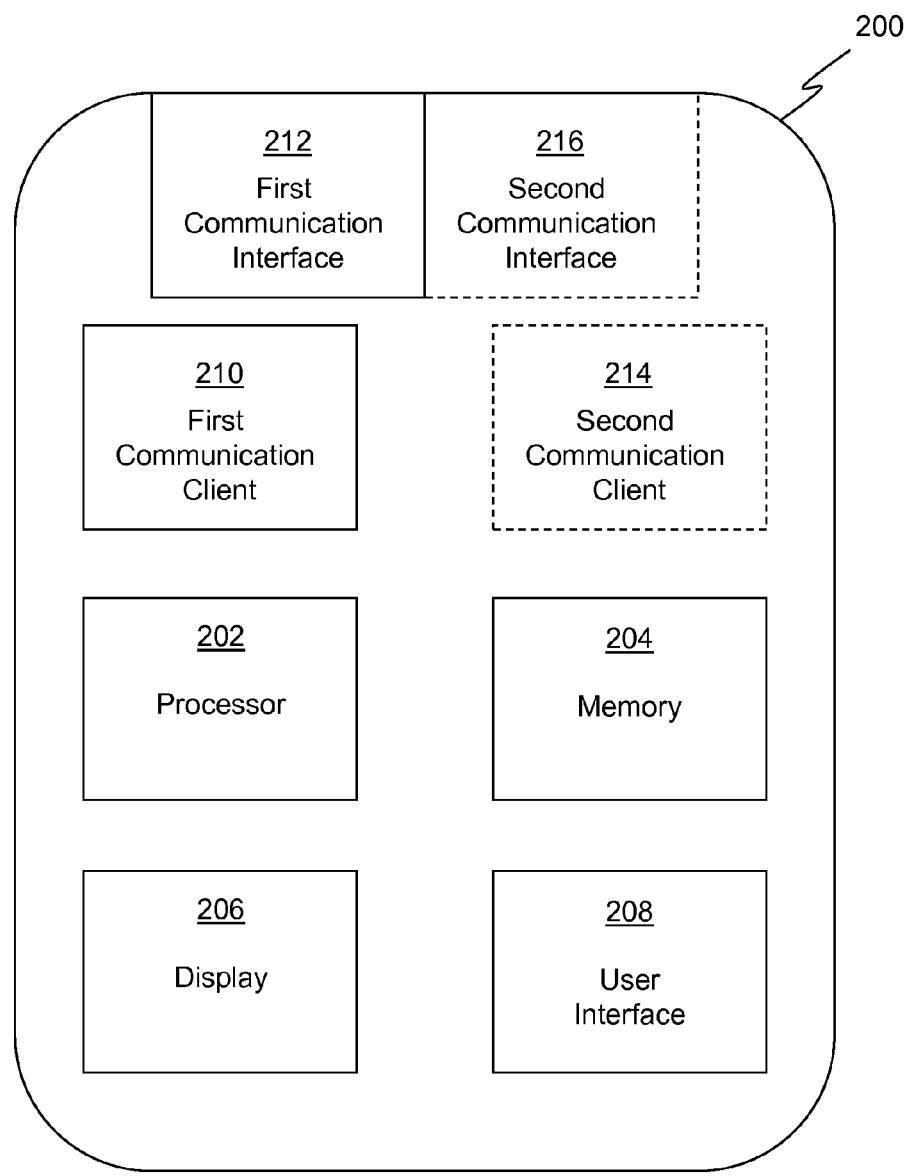
FIG. 2 shows an exemplary communication device adapted to conduct communication sessions such as voice calls in the telecommunication network according to some embodiments.

FIG. 2 shows an exemplary communication device 200 adapted to conduct communication sessions such as voice calls in the telecommunication network 100 according to some embodiments. The communication device 200 may for example comprise the mobile telephone 112 depicted in FIG. 1.

The communication device 200 comprises a processor 202 for carrying out data processing tasks of embodiments. The communication device 200 comprises a memory 204 for storing data associated with embodiments. The communication device 200 comprises a user interface 206 for collecting user input from a user of the device, including user input associated with setting up and acceptance of communication sessions, such as telephone dialling number digits or incoming call acceptance or rejection commands. In some embodiments, the communication device 200 also comprises a display 206. In some embodiments, the user interface 206 may comprise a touch-screen layer overlaying display 206, upon which one or more touch-sensitive screen regions (or 'buttons') are configurable by the processor 202.

The communication device 200 comprises a first communication client 210 adapted to communicate via a first part of telecommunications network 100 via a first communication interface 212. In some embodiments, the first communication client 210 comprises a circuit-switched communication client adapted to communicate via a circuit-switched part 102 of the telecommunications network 100. In such embodiments, the first communication interface 212 is a circuit-switched communication interface.

In some embodiments, the communication device 200 also comprises a second communication client 214 adapted to communicate via a second, different part of the telecommunications network 100 via a second communication interface 216. In such embodiments, the first communication client 210 and the second communication client 214 are described as being co-located on the communication device 200. In some embodiments, the second communication client 214 comprises a packet-switched communication client adapted to communicate via a packet-switched part 104 of the telecommunications network 100. In such embodiments, the second communication interface 216 is a packet-switched communication interface.

In some embodiments, the first communication interface 212 and the second communication interface 216 comprise one or more antennae for wireless radio communication, which may be shared between the first communication interface 212 and the second communication interface 216. In some such embodiments, the first communication interface 212 and the second communication interface 216 comprise a cellular radio modem and a non-cellular radio modem respectively.

In alternative embodiments, the first communication interface 212 and the second communication interface 216 comprise one or more hardware ports for fixed-line communication. In some such embodiments, the first communication interface 212 comprises a PSTN port. In some such embodiments, the second communication interface 216 comprises an Ethernet port.

Figure 3A:
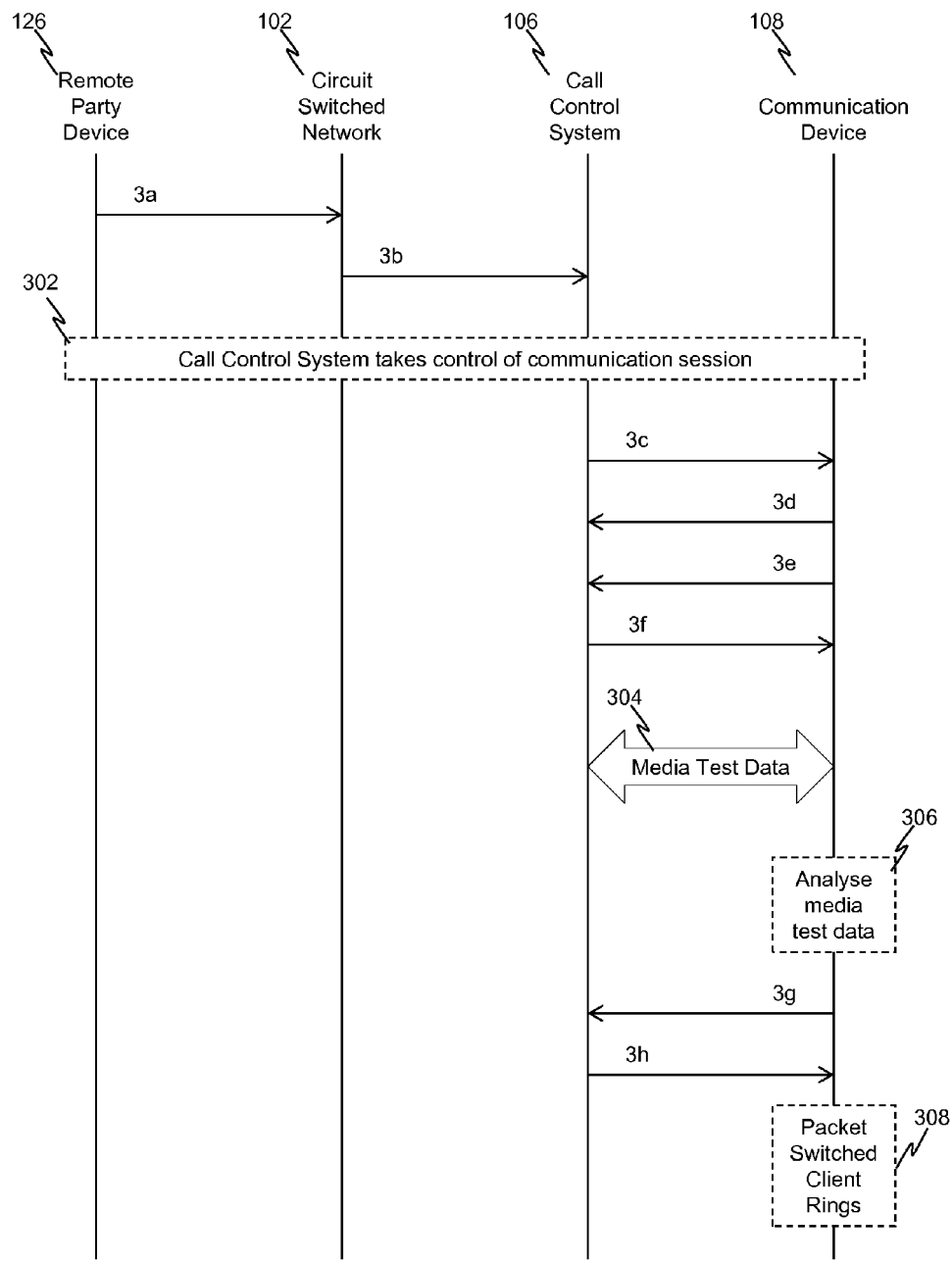
FIGS. 3A and 3B are a message flow diagram showing operation in the telecommunications network of FIG. 1 for routing an incoming call according to some embodiments.
Figure 3B:
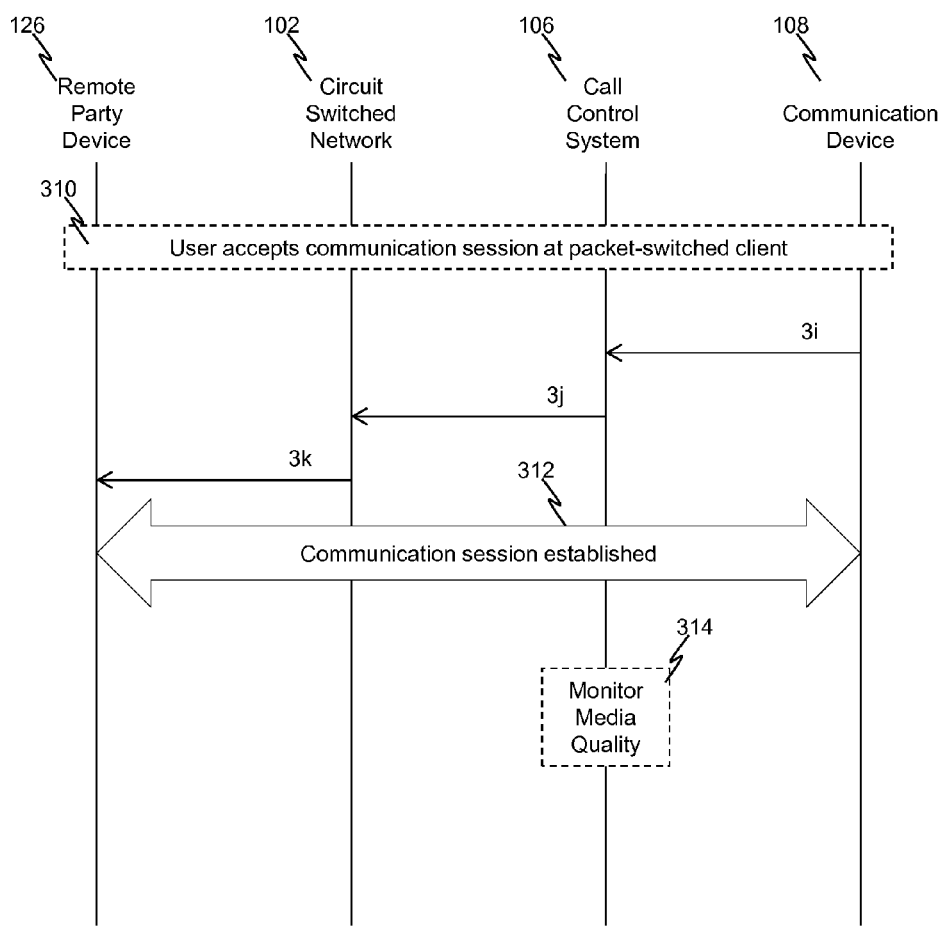

FIGS. 3A and 3B are a message flow diagram showing operation in the telecommunications network 100 of FIG. 1 for routing an incoming call according to some embodiments.

Processing begins at step 3a, when the remote party device 126 transmits a communication session setup request in the form of a call setup request directed to the user and/or one or more of the user's communication devices 108. The communication session setup request of step 3a may pass through a number of further entities or network parts (not shown) between the remote party device 126 and the circuit-switched network 102, such as one or more telephone switches. The circuit-switched network 102 has been configured to route communication session signalling data for calls involving the user—in this case the user is the called party—to the call control system 106. The circuit-switched network 102 contacts the call control system 106 with appropriate communication session signalling data accordingly in step 3b. Upon receipt of the communication session signalling data of step 3b, the call control system 106 takes control of the communication session, as shown by item 302.

The call control system 106 could potentially route the call to the user via either or both of the circuit-switched signalling path 129 and the packet-switched signalling path 131; via the circuit-switched network 102 or the packet-switched network 104 respectively. In some cases, the call control system 106 may route the call to the user via both the circuit-switched signalling path 129 and the packet-switched signalling path 131, for example to a single communication device 108 that has co-located circuit-switched and packet-switched communication clients. In other cases, the call control system 106 may route the call to the user via only one of the circuit-switched signalling path 129 and the packet-switched signalling path 131.

On this occasion, the call control system 106 decides to attempt to route the call to the user over the packet-switched signalling path 131 using SIP. The decision may be based on pre-existing preferences, for example, network and/or user preferences, for example that an attempt to deliver the call to the user over the packet-switched network 104 should be made wherever possible. In this way, the media routing path to be tested, on this occasion the packet-switched media routing paths 130, may be selected from the plurality of media routing paths, in this case, the circuit-switched media routing path 128 and the packet-switched media routing paths 130, based at least on part on pre-existing preferred media routing path selection data. In some embodiments, the existing preferred media routing path selection data may be stored at the user database 107, which, as explained above, may which contain a number of user configurable preferences, such as call routing preferences. In some embodiments, the pre-existing preferred media routing path selection data may be stored at the communication device, for example in memory 204.

At step 3c, the call control system 106 transmits one or more messages that are operable to cause the communication device 108 to perform at least part of the media quality test procedure for the packet-switched media routing path 130 in response to receiving a call setup request directed to the call party, from the remote party device 126. In some embodiments, the call control system 106 transmits the one or more messages via the packet-switched signalling path 131 which is associated with the packet-switched media routing path 130. In some embodiments, the one or more messages includes a call setup request for the call. In some embodiments, the call control system 106 transmits one or more messaged comprising one or more predetermined parameters. The communication device 108 recognises the one or more predetermined parameters and performs at least part of the media quality test procedure. In some embodiments, the call control system 106 sends a SIP INVITE message to the communication device 108 over the packet-switched signalling path 131 via the packet-switched network 104 in an attempt to deliver the terminating call.

At step 3d, the communication device 108 responds with a SIP 100 Trying message over the packet-switched signalling path 131. In some embodiments, at this point, the communication device 108 does not ring to attract the user's attention.

On this occasion, the communication device 108 selects the packet-switched media routing path 130 as a given media routing path to be subject to a media quality test procedure. The communication device 108 may select the packet-switched media routing path 130 to be tested based, for example, on user and/or network preference. For example, the user may have specified that calls should be conducted via the packet-switched network 104 and/or via the packet-switched media routing path 130 where possible.

At step 3e, the communication device 108 sends a SIP INVITE message, the contents of which indicated that it is for a media loopback test. For example, the SIP INVITE message may include SDP that indicates a request for a loopback connection, in accordance with the Internet Draft draft-ietf-mmusic-media-loopback-16. In other embodiments, the SIP INVITE could include, for example, an Alert-Info header set to "Loopback" towards the packet-switched network 104 to initiate a media quality test procedure.

At step 3f, the call control system 106 responds to the INVITE message with a SIP 200 OK message over the packet-switched signalling path 131.

The communication device 108 establishes a media test connection with the call control system 106 over the packet-switched media routing path 130 via the packet-switched network 104 and media test data is communicated via the packet-switched media routing path 130, as shown by item 304. In some embodiments, the call control system 106 performs at least part of the media quality test procedure. For example, the call control system 106 may communicate media test data via the packet-switched media routing path 130 and/or analyse at least some of the media test data. In some embodiments, at least part of the media quality test procedure is performed by the communication device 108 associated with the call party. For example, the communication device 108 may communicate media test data via the packet-switched media routing path 130 and/or analyse at least some of the media test data.

In some embodiments, a given media routing path, such as the packet-switched media routing path 130 may includes one or more intermediate nodes, between the call control system 106 and the communication device 108. The intermediate nodes may be switches, routers, proxies, gateways, wireless access points or such like. In such embodiments, in which there is one or more intermediate nodes, the call control system 106 is not directly connected to the communication device 108.

On this occasion, at item 306, the communication device 108 analyses the media test data, for example by measuring the quality of the looped back media and determines if it is sufficient to support the call to the user.

At step 3g, the communication device 108 transmits one or more messages comprising data derived from the media quality test procedure for the packet-switched media routing path 130 over the packet-switched signalling path 131 to the call control system 106. In some embodiments, the one or more messages includes a call setup response for the call. In some embodiments, the data derived from the media quality test procedure indicates acceptance or rejection of a call setup request directed to the call party. In some embodiments, the derived data comprises media test data metrics and/or measurement information from which the call control system 106 can select a preferred media routing path.

In some embodiments, the derived data comprises an indication of the result of the analysis performed by the communication device 108, for example by transmitting a first predetermined message to indicate that the media quality associated with the given media routing path being tested is sufficient to support the call to the user or by transmitting a second, different predetermined message to indicate that the media quality associated with the given media routing path being tested is not sufficient to support the call to the user.

For example, if the communication device 108 determines the media quality associated with the packet-switched media routing path 130 to be sufficient to support the call to the user, the communication device 108 may respond to the original INVITE call setup request message from the call control system 106 with a SIP 180 Ringing message and may start ringing the user's communication device 108. In this way, the one or more messages comprising the data derived from the media quality test procedure includes a call setup response for the call that indicates acceptance of the call setup request directed to the call party.

However, if the communication device 108 determines the media quality associated with the packet-switched media routing path 130 not to be sufficient to support the call to the user, the communication device 108 may respond to the original SIP INVITE message with a suitable SIP 4 xx response message, for example a SIP 488 Not Acceptable Here response. In this way, the one or more messages comprising the data derived from the media quality test procedure includes a call setup response for the call that indicates rejection of the call setup request directed to the call party.

Based on at least the received data derived from the media quality test procedure, the call control system 106 selects a preferred media routing path from the plurality of media routing paths 128, 130 for communicating media data associated with the call to and/or from at least one communication device 108 associated with the user. The at least one communication device 108 may be the same as the communication device 108 involved in the media quality test procedure or may be a different communication device 108. For example, the communication device 108 involved in the media quality test procedure may only be able to conduct communications via the packet-switched network 104. If the packet-switched media routing path 130 is determined not to be sufficient to support the call to the user, then the call control system 106 may select the circuit-switched media routing path 126 as the preferred media routing path. If the communication device 108 involved in the media quality test procedure is only able to conduct communications via the packet-switched network 104 then the media data associated with the call cannot be routed to that communication device 108 over the preferred media routing path, but could, instead, be routed to one or more different communication devices 108 associated with the user (where available) that is able to conduct communications over the preferred media routing path via the circuit-switched network 102.

However, on this occasion, the call control system 106 selects the packet-switched media routing path 130 as the preferred media routing path and attempts to terminate the call to the user over the packet-switched signalling path 131 and the packet-switched media routing path 130 via the packet-switched network 104.

Accordingly at step 3h, the call control system 106 transmits a communication session setup request to the communication device 108 over the packet-switched signalling path 131. Upon receipt of the communication session setup request, the communication device 108 alerts the user to the request for the incoming communication, as shown by item 308. Such alert may involve activating one or more alert functions on the communication device 108, such as ring and/or vibrate functions.

The user accepts the communication session setup request, at item 310, by entering appropriate user input, for example by pressing an answer key via a user interface on the communication device 108. The communication device 108 transmits a communication session setup response message (in this case an acceptance response message) back to the call control system 106 over the packet-switched signalling path 131, as shown by step 3i. The call control system 106 then transmits a communication session setup response (acceptance) message back to the remote party device 126 via the circuit-switched network 102, at steps 3j and 3k. Having completed the end-to-end communication session setup signalling flow, a communication session is established between the remote party device 126 and the communication device 108, at item 312. Media data associated with the call can then be communicated via the preferred media routing path, the packet-switched media routing path 130, to and/or from the communication device 108.

The term "Voice Call Continuity" (VCC) is used herein generally to refer to the selection of a preferred media routing path for an already-established call and possible transition from a non-preferred media routing path to a preferred media routing path. In some embodiments, VCC is provided by the call control system 106. In some embodiments, VCC is provided by the call control system 106 in cooperation with one or more other entities in the telecommunications network 100. In some embodiments, VCC is provided by the call control system 106 in cooperation with the communication device 108.

At least one communication device 108 associated with a call party is involved in the call and at least one remote party device 126 associated with a remote call party is involved in the call.

In some embodiments, the call control system 106 acts as a media quality monitoring entity intermediate the at least one communication device 108 and the at least one remote party device 126. The call control system 106 performs at least part of a media quality monitoring procedure for the packet-switched media routing path 130 via which media data associated with the call is being communicated. In some embodiments, the call control system 106 remains on the media path, for example by specifying that it should remain on the media path when setting up the call, and relays both upstream and downstream media streams between the communication device 108 and the remote party device 126. The call control system 106 may monitor the media quality of the media stream associated with the call, as indicated by item 314.

In some embodiments, the call control system 106 analyses at least some of the media data being communicated via the packet-switched media routing path 130. In some embodiments, the call control system 106 determines a media quality associated with the analysed at least some of the media data.

In some embodiments, the call control system relays media data associated with the call from the at least one communication device 108 via the packet-switched media routing path 130. In some embodiments, the call control system 106 analyses at least some media data associated with the call that is being communicated from the at least one communication device 108 via the packet-switched media routing path 130. For example, the call control system 106 may monitor the media quality associated with upstream media data over the packet-switched media routing path 130 by observing the packet loss, jitter and delay of upstream media data associated with the call, such as RTP packets.

In some embodiments, the call control system 106 relays media data associated with the call to the at least one communication device 108 via the packet-switched media routing path 130. In some embodiments, the call control system 106 analyses at least some media data associated with the call that is being communicated to the communication device 108 via the packet-switched media routing path 130. For example, the call control system 106 may indirectly monitor the media quality associated with downstream media data over the packet-switched media routing path 130 by monitoring media quality reports, such as RTCP reports, from the communication device 108. The call control system 106 may monitor the media quality of the media quality associated with the call instead of, or in addition to, the communication device 108 monitoring the quality of downstream media data.

On this occasion, the call control system 106 determines that media quality in one or both directions has become unacceptable, for example if the media quality in either direction has degraded beyond a pre-set threshold condition. The call control system 106 selects a preferred media routing path, from the plurality of media routing paths, for communicating media data associated with the call to and/or from one or more of the at least one communication devices associated with the call party. On this occasion, the call control system selects the circuit-switched media routing path 128 as the preferred media routing path for communicating media data associated with the call to and/or from one or more communication devices 108 associated with the user. The call control system 106 then transitions the call so that media data associated with the call is communicated to and/or from the communication device 108 (or another communication device 108 associated with the user) via the now-preferred circuit-switched media routing path 128 over the circuit-switched network 102. Such transitioning may comprise transmitting a communication session setup request to the communication device 108 over the circuit-switched signalling path 129 and, upon acceptance, tearing down the media connection to communication device 108 over the packet-switched media routing path 130 by sending appropriate signalling, such as a SIP BYE message, over the packet-switched signalling path 131.

In some embodiments, an established communication session 312 consists of multiple communication session legs. A communication session leg is a subset of the established communication session that provides spans only a part of a communication session path. For example, communication session 312 may comprise one communication session leg between remote party device 126 and call control system 106, and another communication session leg between call control system 106 and communication device 108. This allows call control system 106 to maintain its presence on the communication session path and provide additional features or call services if required. Each of the communication session legs between call control system 106 and the remote party device 126 may actually be subdivided into a number of further legs, but will be discussed henceforth as a single leg for the sake of simplicity. Further, the communication session legs need not connect to the same node in call control system 106 and may be bridged by one or more further legs in order to provide the required end-to-end communications.

Figure 4A:
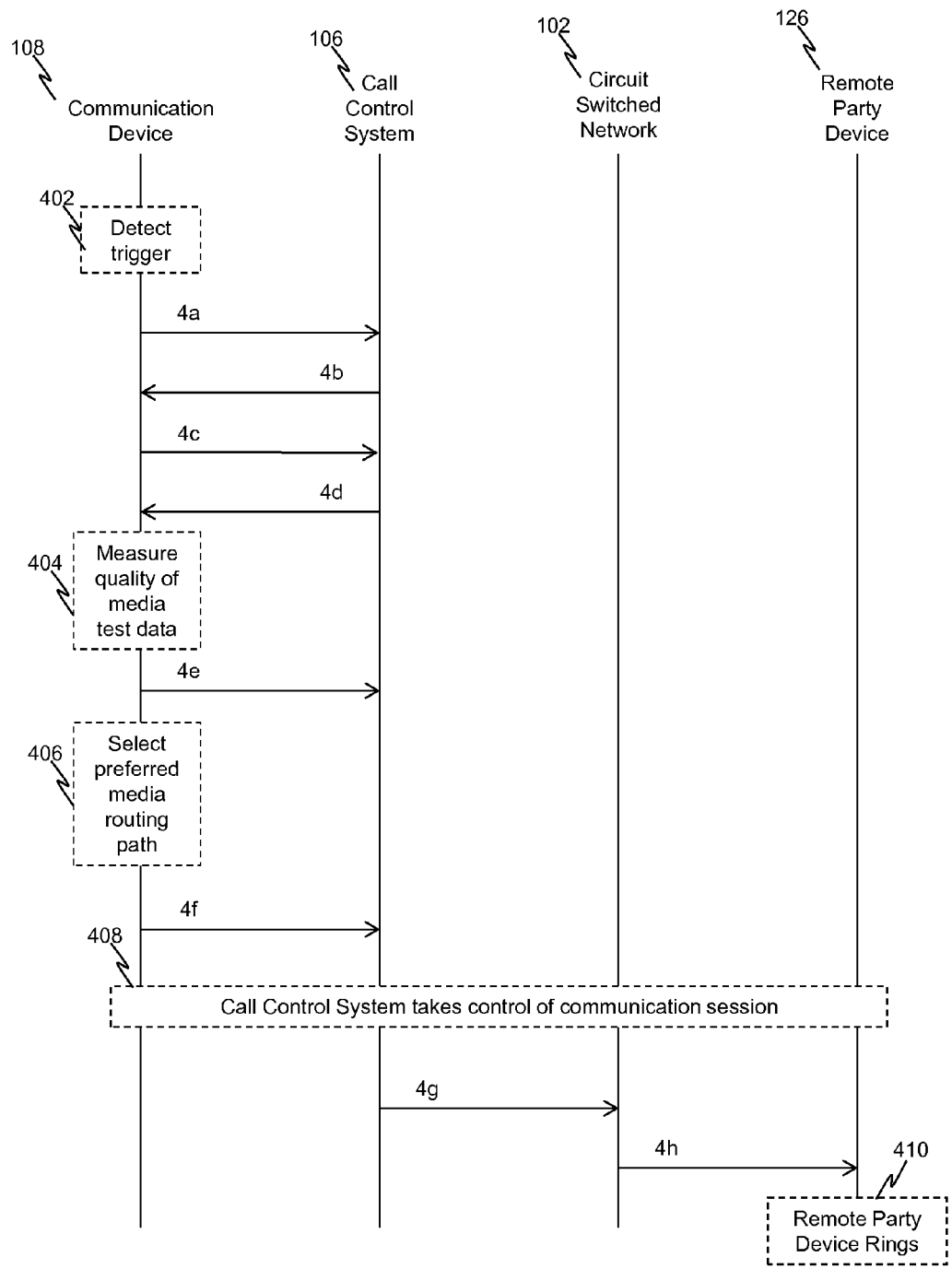
FIGS. 4A and 4B show a message flow diagram describing operation in telecommunications network of FIG. 1 for controlling a communication device associated with the user, in accordance with some embodiments.
Figure 4B:
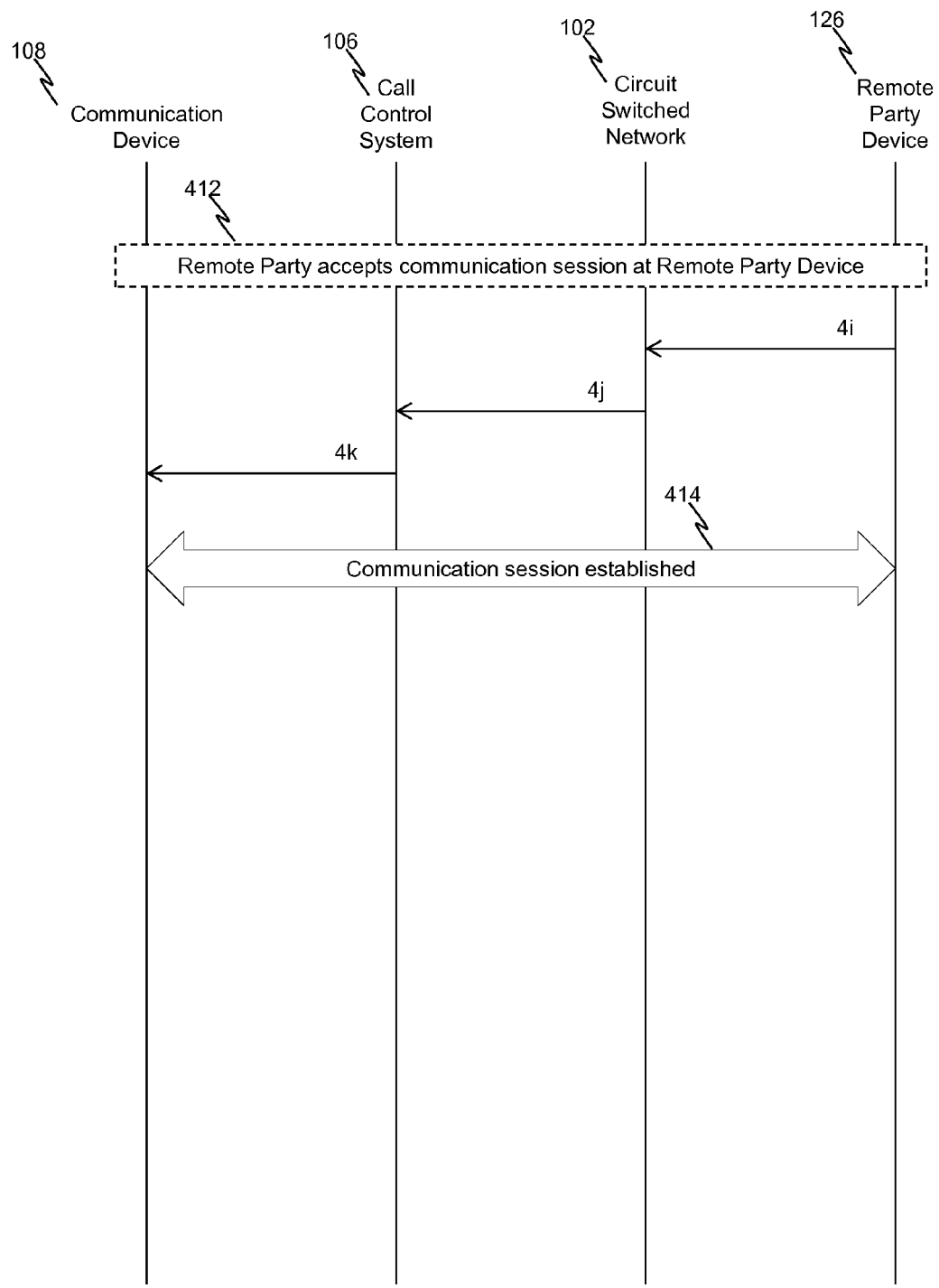

FIGS. 4A and 4B are a message flow diagram showing operation in telecommunications network 100 of FIG. 1 for controlling a communication device 108 associated with the user, in accordance with some embodiments.

In these embodiments, the communication device 108 initiates a media quality test procedure for the packet-switched media routing path 130, determines that the packet-switched media routing path 130 would support the call with sufficient quality and selects the packet-switched media routing path 130 as a preferred media routing path. Media data associated with the call is then routed between the communication device 108 and the call control system 106 over the preferred, packet-switched media routing path 130 via the packet-switched network 104.

Processing begins at item 402 when the communication device 108 detects one or more predetermined triggers prior to originating the call. In some embodiments, the communication device 108 initiates a media quality test procedure in response to detecting the one or more predetermined triggers. In some embodiments, the one or more predetermined triggers includes detecting an attempt to originate the call. In some embodiments, the one or more predetermined triggers includes detecting activity that may lead to a call origination attempt.

In response to detecting the one or more predetermined triggers, the communication device 108 initiates a media quality test procedure for a given media routing path; in this case the packet-switched media routing path 130. In some embodiments, the communication device 108 selects the packet-switched media routing path 130 from the plurality of media routing paths based at least on part on pre-existing preferred media routing path selection data which may, for example, be store in memory 204.

At step 4a, the communication device 108 transmits a SIP INVITE message over the packet-switched signalling path 131. The contents of the SIP INVITE message are modified to indicate that the message is for a media quality test call or procedure. This may be, for example, by including SDP that indicates a request for a loopback connection, as explained above.

The call control system 106 receives the SIP INVITE and recognises the SIP INVITE message as requesting a media quality test call at least on the basis of the SDP that indicates the request for the loopback connection. At step 4b, the call control system 106 responds to the SIP INVITE message of step 4a with a SIP 200 OK response over the packet-switched signalling path 131. The response includes a Session Description Protocol (SDP) offer that identifies a loopback media port to which the communication device 108 can send media test data over the packet-switched media routing path 130.

At step 4c, following receipt of the SIP 200 OK response, the communication device 108 sends media test data via the packet-switched media routing path 130 towards the designated port on the call control system 106. The media test data may, for example, comprise a series of RTP media test packets.

At step 4d, the call control system 106 sends each media test packet back towards the communication device 108 over the packet-switched media routing path 130.

At item 404, the communication device 108 analyses the media test data to assess the media quality associated with the packet-switched media routing path 130. The communication device 108 may measure the round trip delay, packet loss and jitter of the returned media test stream and derive an estimate of media quality associated with packet-switched media routing path 130. Since the media test stream has been sent both upstream and downstream over the packet-switched media routing path 130, the media test stream received at the communication device 108 has been subjected to both upstream and downstream quality impairments in the packet-switched media routing path 130. The derived estimate of media quality represents an aggregate of upstream and downstream quality associated with the packet-switched media routing path 130.

At step 4e, having analysed the test media stream, the communication device 108 tears down the test media call with the call control system 106 by sending a SIP BYE request to the call control system 106 over the packet-switched signalling path 131. In this way, the media quality test procedure includes media test data being communicated via the packet-switched media routing path 130 and the media test data being analysed.

At item 406, the communication device 108 selects a preferred media routing path from the plurality of media routing paths 128, 130 for communicating media data associated with the call to and/or from the call control system 106. On this occasion, the communication device 108 determines the media quality associated with the packet-switched media routing path 130 to be sufficient to support the originating call directed to the remote party and selects the packet-switched media routing path 130 as the preferred media routing path, at least in part on the basis of the media quality test procedure.

As such the communication device 108 decides whether to use the packet-based network 104 for the originating call, based on knowledge not just of the mere availability of connectivity to the packet-switched network 104, but also of the expected media quality over the packet-switched network 104.

At step 4f, the communication device 108 transmits a communication session setup request directed to the remote party device 126 to the call control system 106 over the packet-switched signalling path 131. Upon receipt of the communication session setup request of step 4f, the call control system 106 takes control of the communication session, as shown by item 408.

Having taken control of the communication session, the call control system 106 transmits a communication session setup request to the remote party device 126 via the circuit-switched network 102, at steps 4g and 4h. The communication setup request of step 4h may pass through a number of further entities or network parts (not shown) between the remote party device 126 and the circuit-switched network 102, such as one or more telephone switches.

Upon receipt of the communication session setup request, the remote party device 126 alerts the remote party to the request for incoming communication as shown by item 410. The remote party accepts the communication session setup request at step 412. This results in remote party device 126 transmitting a communication session setup response message (in this case an acceptance response message) back to the circuit-switched network 102, at step 4i. The circuit-switched network 102 has been configured to route communication session signalling data relating to calls involving the user to the call control system 106, and contacts the call control system 106 with appropriate communication session signalling data accordingly, at step 4j.

Upon receipt of the communication session signalling data of step 4j, the call control system 106 then transmits a communication session setup response (acceptance) message back to the communication device 108 over the packet-switched signalling path 131, at step 4k. Having completed the end-to-end communication session setup signalling flow, a communication session is established between the communication device 108 and the remote party device 126, as shown by item 414. Media data associated with the call is then routed between the remote party device 126 and the call control system 106 over the third media routing path 132 via the circuit-switched network 102 and between the call control system 106 and the communication device 108 over the preferred, packet-switched media routing path 130 via the packet-switched network 104.

Figure 5A:
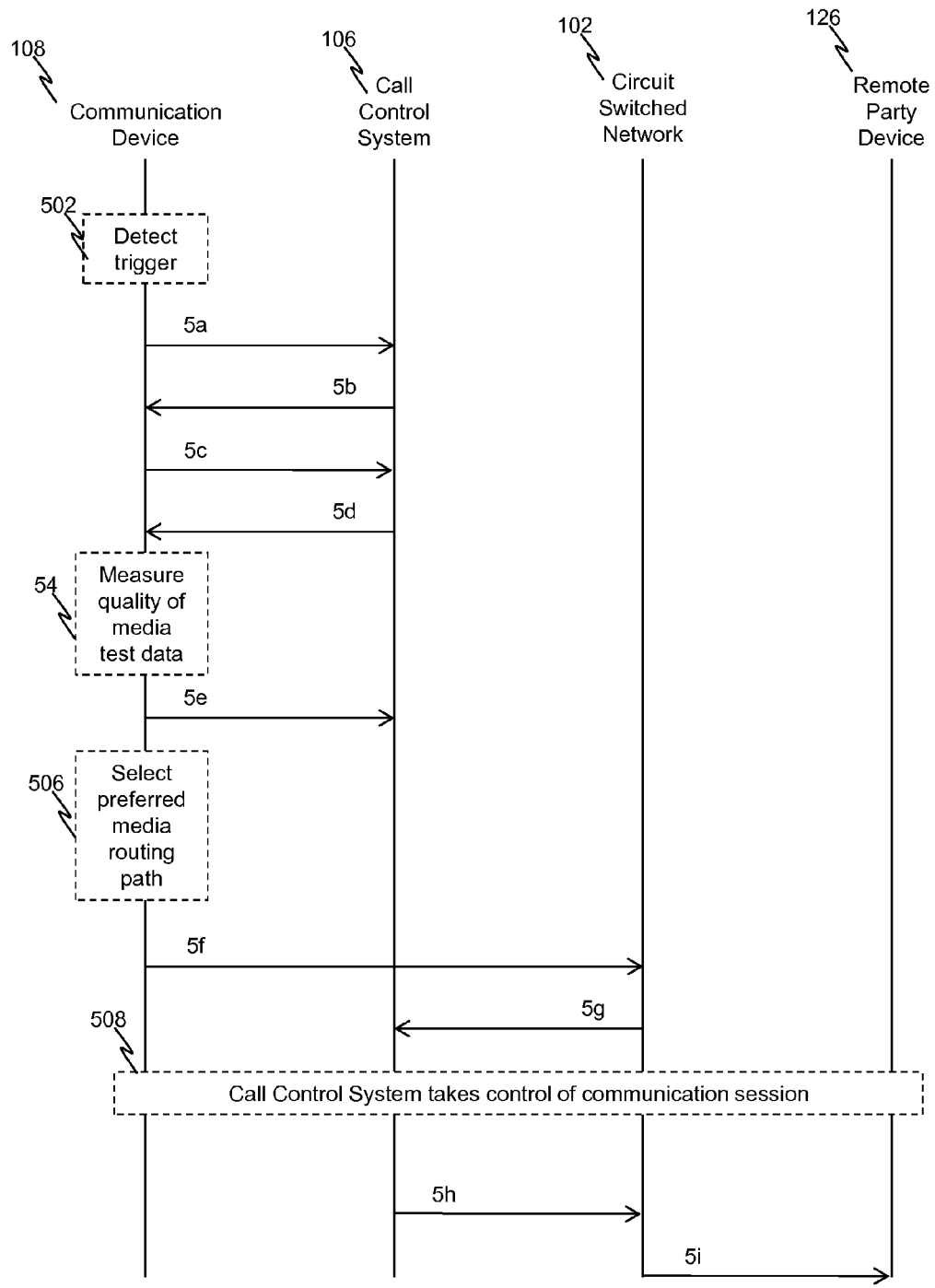
FIGS. 5A and 5B show a message flow diagram describing operation in telecommunications network of FIG. 1 for controlling a communication device associated with the user, in accordance with some embodiments.
Figure 5B:
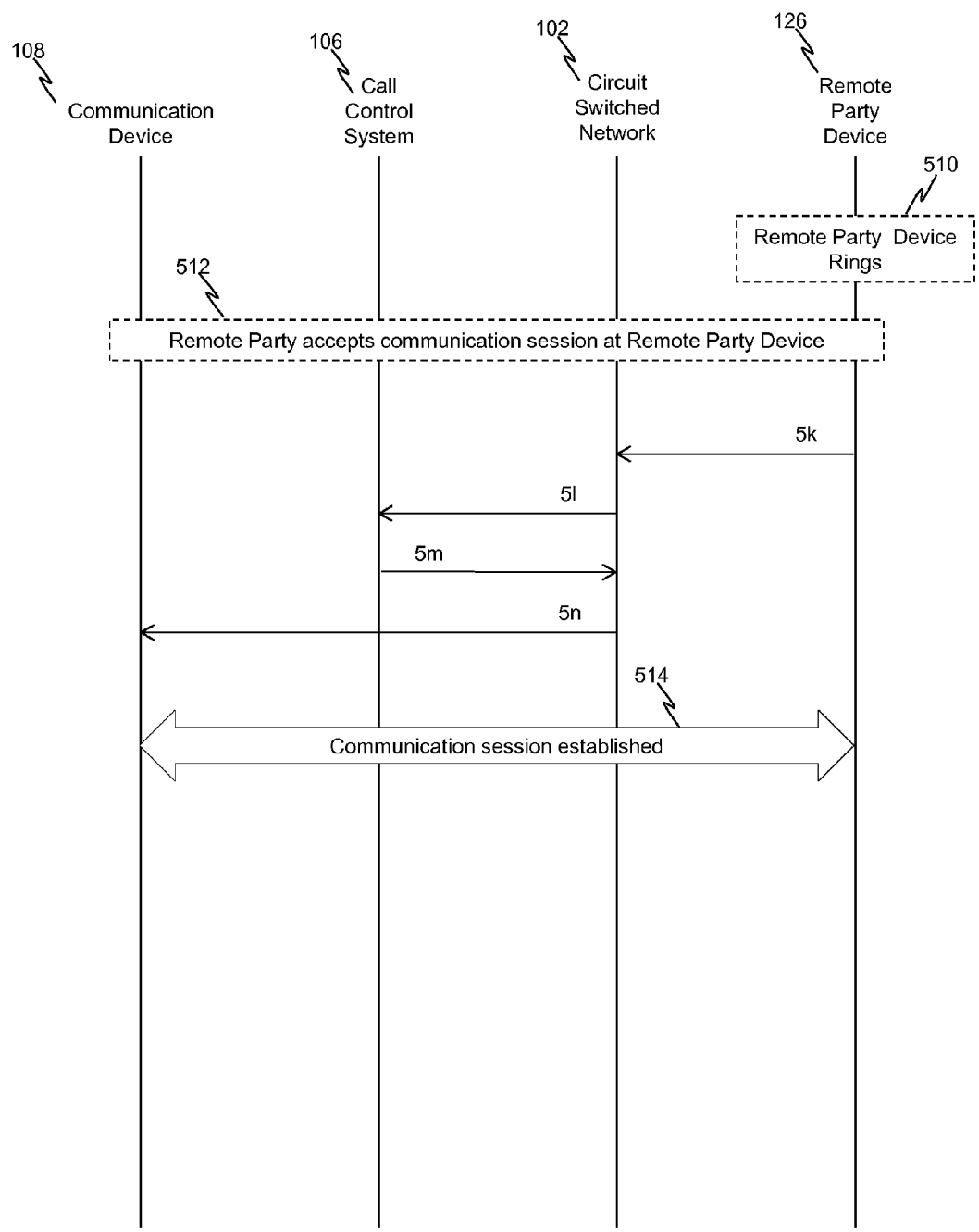

FIGS. 5A and 5B shows a message flow diagram describing operation in telecommunications network 100 of FIG. 1 for controlling a communication device 108 associated with the user, in accordance with some embodiments.

In these embodiments, the communication device 108 initiates a media quality test procedure for the packet-switched media routing path 130, determines that the packet-switched media routing path 130 would not support the call with sufficient quality and selects the circuit-switched media routing path 128 as a preferred media routing path. Media data associated with the call is then routed between communication device 108 and the call control system 106 over the preferred, circuit-switched media routing path 128 via the circuit-switched network 102.

Processing begins at item 502 when the communication device 108 detects one or more predetermined triggers prior to originating the call. In response to detecting the one or more predetermined triggers, the communication device 108 initiates a media quality test procedure for a given media routing path; in this case the packet-switched media routing path 130.

At step 5a, the communication device 108 initiates the media quality test by transmitting a SIP INVITE message over the packet-switched signalling path 131. The contents of the SIP INVITE message are modified to indicate that the message is for a media quality test call or procedure. This may be, for example, by including SDP that indicates a request for a loopback connection.

The call control system 106 receives the SIP INVITE and recognises the SIP INVITE message as requesting a media quality test call at least on the basis of the SDP that indicates the request for the loopback connection. At step 5b, the call control system 106 responds to the SIP INVITE message of step 5a over the packet-switched signalling path 131 with a SIP 200 OK response that includes a Session Description Protocol (SDP) offer that identifies a loopback media port to which the communication device 108 can send media test data.

At step 5c, following receipt of the SIP 200 OK response, the communication device 108 sends media test data, for example a series of Real-time Transport Protocol (RTP) media test packets, towards the designated port on the call control system 106 over the packet-switched media routing path 130.

At step 5d, the call control system 106 sends each media test packet back towards the communication device 108 over the packet-switched media routing path 130.

At item 504, the communication device 108 analyses the media test data to assess the media quality associated with the packet-switched media routing path 130.

At step 5e, having analysed the test media stream, the communication device 108 tears down the test media call with the call control system 106 by sending a SIP BYE request over the packet-switched signalling path 131. In this way, the media quality test procedure includes media test data being communicated via the packet-switched media routing path 130 and the media test data being analysed.

At item 506, the communication device 108 selects a preferred media routing path from the plurality of media routing paths 128, 130 for communicating media data associated with the call to and/or from the call control system 106. On this occasion, the communication device 108 determines the media quality associated with the packet-switched media routing path 130 not to be sufficient to support the originating call directed to the remote party and selects a media routing path 126 other than the packet-switched media routing path 130, on this occasion the circuit-switched media routing path 128, as the preferred media routing path, at least in part on the basis of the media quality test procedure.

As such the communication device 108 decides whether to use the packet-based network 104 for the originating call, based on knowledge not just of the availability of connectivity to the packet-switched network 104, which is available on this occasion, but also of the expected media quality over the packet-switched network 104, which is considered not to be sufficient on this occasion.

At step 5f, the communication device 108 transmits a communication session setup request directed to the remote party device 126 over the circuit-switched signalling path 129 via the circuit-switched network 102.

The circuit-switched network 102 has been configured to route communication session signalling data for calls involving the user to the call control system 106, and the contacts call control system 106 with appropriate communication session signalling data accordingly at step 5g. Upon receipt of the communication session signalling data of step 5g, the call control system 106 takes control of the communication session, as shown by item 508.

Having taken control of the communication session, the call control system 106 transmits a communication session setup request over the third signalling path 133 via the circuit-switched network 102 to the remote party device 126, at steps 5h and 5i. The communication setup request of step 5i may pass through a number of further entities or network parts (not shown) between the remote party device 126 and the circuit-switched network 102, such as one or more telephone switches.

Upon receipt of the communication session setup request, the remote party device 126 alerts the remote party to the request for incoming communication as shown by item 510. The remote party accepts the communication session setup request at step 512. This results in the remote party device 126 transmitting a communication session setup response message (in this case an acceptance response message) back to call control system 106 over the third signalling path 133 via the circuit-switched network 102, at step 5k. The circuit-switched network 102 has been configured to route communication session signalling data relating to calls involving the user to the call control system 106, and contacts the call control system 106 with appropriate communication session signalling data accordingly at step 5l.

Upon receipt of the communication session signalling data of step 5l, the call control system 106 then transmits a communication session setup response (acceptance) message back to the communication device 108 over the circuit-switched signalling path 131 via the circuit-switched network 102, at steps 5m and 5n. Having completed the end-to-end communication session setup signalling flow, a communication session is established between the remote party device 126 and the call control system 106 over the third media routing path 132 via the circuit-switched network 102 and between the call control system 106 and the communication device 108 over the preferred, circuit-switched media routing path 130, as indicated by item 514. Media data associated with the call is then routed between the call control system 106 and the communication device 108 over the preferred, circuit-switched media routing path 130 via the circuit-switched network 104.

In embodiments described above with reference to FIGS. 5A and 5B, the communication device 108 determined the media quality associated with the packet-switched media routing path 130 not to be sufficient and selected a media routing path 126 other than the packet-switched media routing path 130, on that occasion the circuit-switched media routing path 128, as the preferred media routing path, at least in part on the basis of the media quality test procedure. The communication device 108 transmitted a communication session setup request directed to the remote party device 126 over the circuit-switched signalling path 129 via the circuit-switched network 102.

In other embodiments, instead of the communication device 108 transmitting the communication session setup request directed to the remote party over the circuit-switched signalling path 129 via the circuit-switched network 102, the communication device 108 may transmit the communication session setup request directed to the remote party to the call control system 106 over the packet-switched signalling path 131 via the packet-switched network 104. In such other embodiments, the communication device 108 may be configured to transmit data derived from the media quality test procedure for the media routing path being tested, on this occasion the packet-switched media routing path 130, to the call control system 106. The call control system 106 may be configured to select the preferred media routing path, on this occasion the circuit-switched media routing path 128, for communicating media data associated with the call to and/or from the communication device 108, on the basis of at least the data derived from the media quality test procedure that was received from the communication device 108. On this occasion, the call control system 106 may transmit a first communication session setup request directed to the communication device 108 over the circuit-switched signalling path 129 via the circuit-switched network 102 (or possibly via the packet-switched signalling path 131 if media data associated with the call could still be communicated via the preferred, circuit-switched media routing path 128), which could automatically be accepted by the communication device 108 upon receipt, and a second communication session setup request directed to the remote party device 126 via the circuit-switched network 102.

Figure 6:
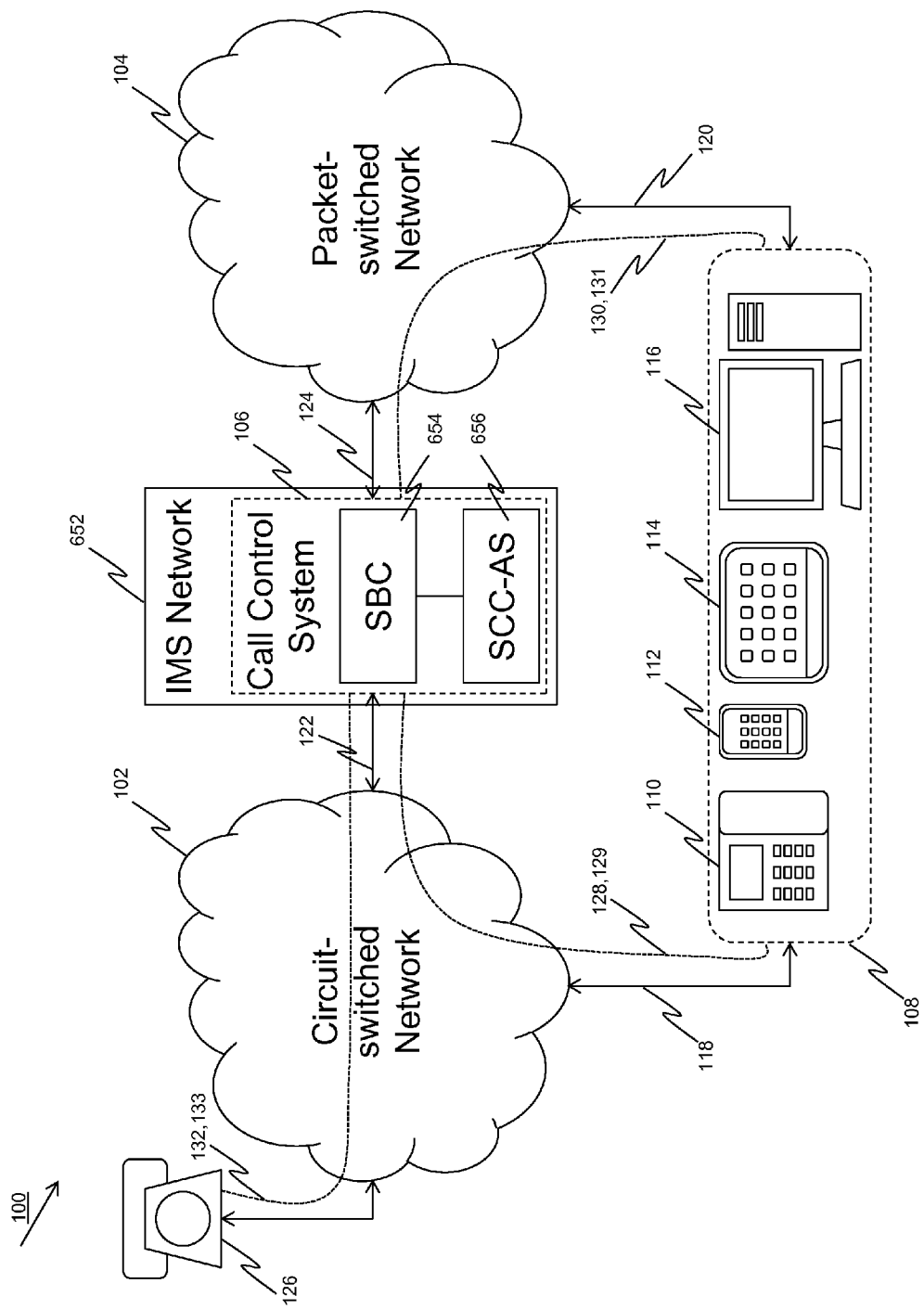
FIG. 6 shows telecommunications network depicted in FIG. 1 in more detail according to embodiments.

FIG. 6 shows telecommunications network 100 depicted in FIG. 1 in more detail according to embodiments.

Similarly to the telecommunications network 100, the telecommunications network 100 includes a circuit-switched network 102 and a packet-switched network 104. The telecommunications network 100 also includes a SIP-based network in the form of an IP Multimedia Subsystem (IMS) network 652. IMS networks have an architecture developed by the 3GPP wireless standards body for providing both mobile and fixed multimedia services.

The IMS network 652 includes a call control system 106. The call control system 106 includes a Session Border Controller (SBC) entity 654 that controls call-related signalling information and media streams in the IMS network 656. The SBC entity 654 may comprise a Proxy Call Session Control Function (P-CSCF) entity and a Border Gateway Function (BGF) entity whose function in the IMS architecture is known in the art and will not be described here in detail. In some embodiments, the call control system 106 also includes a service platform 656 which provides call processing and control, and is referred to as an application server (AS) to accord with standard notation for an IMS architecture. In some embodiments, the application server 656 is a Service Centralization & Continuity Application Server (SCC-AS). The SCC-AS 656 may, for example, determine which of two paths to route any given terminating call over (TADS) and/or may cooperate with a communication device 106 to perform VCC.

As explained above, a communication device 108 may test the quality of voice media over the packet-switched network 104 before attempting to originate a call over WiFi. The communication device 108 may initiate this test by sending a SIP INVITE towards the network. The contents of the INVITE message indicate to the network 100 that this is a media test call. The first SIP signalling element in the network 100 that receives such an INVITE, in this case the access SBC 654, recognizes the INVITE as requesting a test call. The SBC 654 responds with a 200 OK response that includes an SDP offer that identifies a loopback media port to which the communication device 108 can send media. On receipt of the 200 OK response, the communication device 108 sends a series of RTP test media packets towards the designated port on the SBC 662, which turns each packet round and sends it back towards the communication device 108. The communication device 108 may measure the round trip delay, packet loss and jitter of the returned media stream to derive an estimate of media quality for the WiFi access network.

The SCC-AS 656 may cooperate with the communication device 108 and the access SBC 654 to determine the quality of WiFi coverage by means of a test loopback call before deciding whether to deliver the call via the circuit-switched network 102 or via the packet-switched network 102. In some embodiments, the SCC-AS 656 sends a SIP INVITE to the communication device 108 as an attempt to deliver the terminating call. The communication device 108 responds with 100 Trying and does not ring. The communication device 108 may send an INVITE with SDP that indicates a request for a loopback connection towards the network. The access SBC 654 intercepts this INVITE and responds with 200 OK to enable the communication device 108 to establish a test media connection to the access SBC 654. The communication device 108 measures the quality of the looped back media and determines if it is good enough to support the call. If so, the communication device 108 responds to the original INVITE with 180 Ringing and starts to ring. The SIP-based call setup then proceeds as described above. If not, the communication device 108 responds to the original INVITE with a suitable 4xx response, for example 488 Not Acceptable Here. The SCC-AS 656 may take this as an indication that it cannot deliver the call over the packet-switched network 104 (or at least over a media routing path in the packet-switched network 104 that was tested), and attempts to deliver the call via the circuit-switched network 102.

Other ways of establishing a loopback test media call with the communication device 108 are envisaged, for example by originating the setup of such a test call from the SCC-AS 656 itself.

When the communication device 108 enters an area of WiFi coverage, the communication device 108 will typically register with the network 100. Once successfully registered, if the communication device 108 is currently engaged in a call via the circuit-switched network 102, the communication device 108 may indicate to the SCC-AS 656 that it wishes to switch the call from the circuit-switched network 102 to the packet-switched network 104. This indication could be sent by some out-of-band means (e.g. via an HTTP request) or by making some specific use of SIP signalling towards the SCC-AS 656. In some embodiments, the communication device 108 tests the media quality of the WiFi access network by establishing a test media loopback connection before deciding to indicate to the SCC-AS 656 that it wishes to switch the call to the WiFi access network. In some embodiments, the access SBC 654, which is typically relaying both upstream and downstream media streams, monitors the media quality of a call involving the user and send reports to the SCC-AS 656 in the event that media in either direction becomes unacceptable. This may be done instead of, or in addition to, the communication device 108 monitoring the quality of downstream media. The access SBC 654 may monitor the quality of upstream media by observing the packet loss, jitter and delay of upstream RTP packets, and can indirectly monitor the quality of the downstream media on the WiFi access network by monitoring RTCP reports from the communication device. When the access SBC 654 detects the media quality in either direction degrading beyond a pre-set threshold condition, it may indicate degraded media to the SCC-AS 656 by means of SIP signalling, for example a SIP INFO or PUBLISH message containing a voice quality alert report according to RFC 6035. Upon receipt of such a voice quality alert report, the SCC-AS 656 may then switch the call to the circuit-switched network 102.

Figure 7:
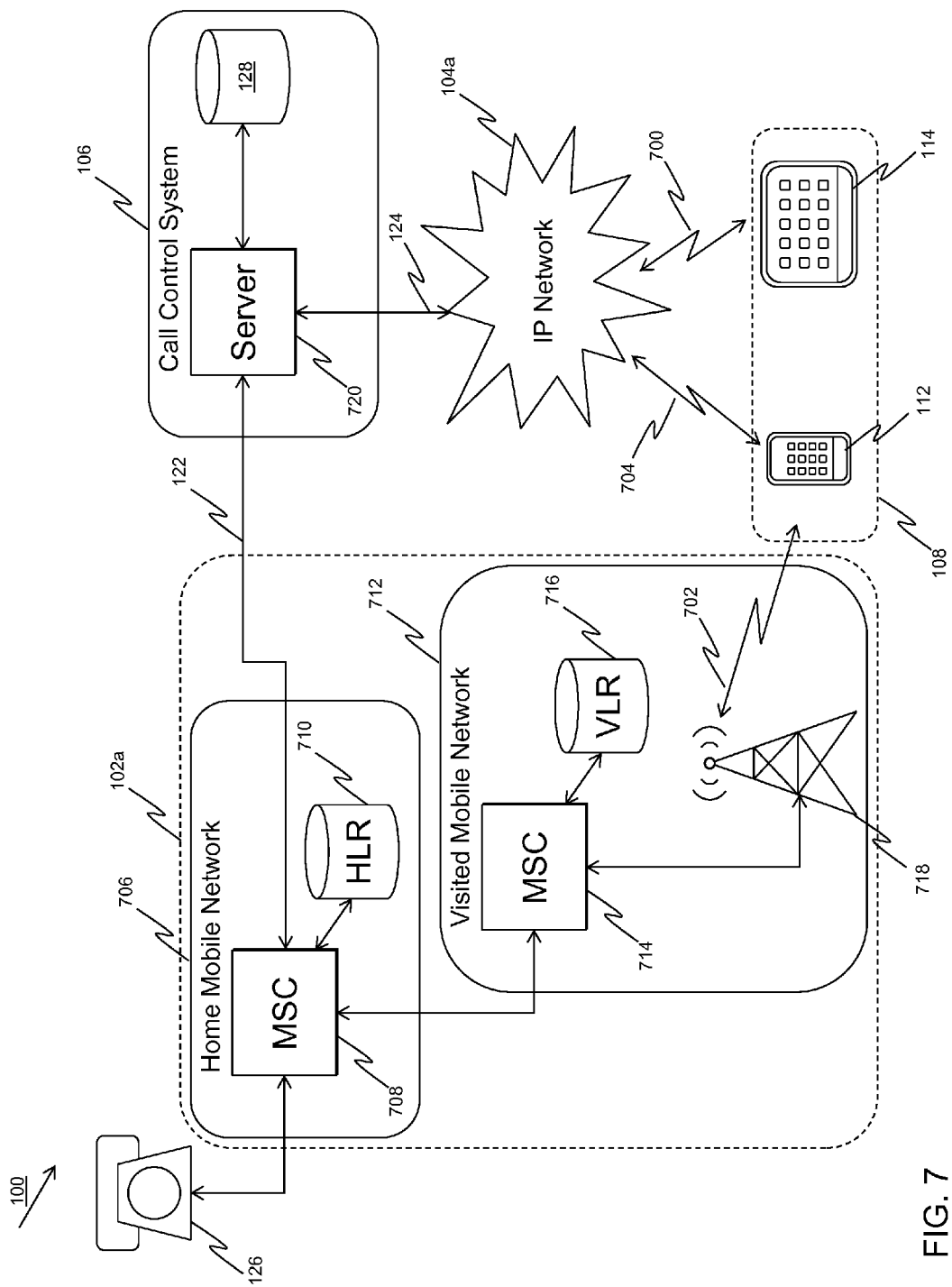
FIG. 7 shows telecommunications network depicted in FIG. 1 in more detail according to embodiments.

FIG. 7 shows telecommunications network 100 depicted in FIG. 1 in more detail according to embodiments; in such embodiments, circuit-switched network part 102 comprises a mobile (or 'cellular') telephony network part 102a, and packet-switched network part 104 comprises IP network part 104a. A client-shared telephony service is hosted and controlled by a call control system 106.

According to the embodiments shown in FIG. 7, a user of the client-shared telephony service has a number of devices 108 associated with their multiple communication client shared dialling number through which they may conduct communications via the service. The user's associated devices include, at least, mobile telephone 112. In embodiments, the user's associated devices also include tablet 114.

Mobile telephone 112 is equipped with a cellular radio telephony interface and circuit-switched communications client for conducting communications in telecommunications network 100 via radio link 702 with mobile telephony network part 102a. Mobile telephone 112 is also equipped with at least one wireless packet-switched interface and packet-switched communications client for conducting communications in telecommunications network 100 via radio link 704 with IP network part 104a. This wireless packet-switched interface could comprise a short-range radio interface such as WiFi or Bluetooth, and/or an interface for communication of packet data over a mobile network, such as LTE-A, HSPA, W-CDMA or Mobile WiMax. In such embodiments where mobile telephone 112 is equipped with multiple communication clients, the communication clients can be referred to as co-located communication clients.

Tablet 114 is equipped with at least one wireless packet-switched interface and packet-switched communications client for conducting communications in telecommunications network 100 via radio link 700 with IP network 104a.

Mobile telephony network part 102a allows for provision of telephony services to a number of mobile telephones, although only the user's mobile telephone 710 is depicted. Mobile telephony network part 102a comprises home mobile network part 706, which is generally associated with mobile telephone 112. Communication sessions initiated to a telephone dialling number associated with mobile telephone 112, e.g. a Mobile Station International Subscriber Directory Number (MSISDN), are routed to home mobile network part 706 for processing as a result of that general association. Home mobile network part 706 comprises mobile switching centre (MSC) 708 and home location register (HLR) 710. HLR 710 comprises a database which provides MSC 708 with data relating to users generally associated with home mobile network 706 upon request, such as the location of their mobile telephones and any configuration data (such as call routing triggers, billing information etc.).

Mobile telephony network part 102a also comprises visited mobile network part 712, which is transiently associated with mobile telephone 112. Visited mobile network part 712 comprises serving MSC 714, Visitor Location Register (VLR) 716 and base transceiver station (BTS) 718. BTS 718 transmits radio signals to, and receives radio signals from, the circuit-switched communications client and cellular radio telephony interface on mobile telephone 112 and radio communication link 702. It is this communication relationship that provides the transient association between mobile telephone 112 and visited mobile network part 712. Mobile telephone 112 is located in an area (commonly known as a 'cell') served by BTS 718. BTS 718 may be controlled by a basestation controller (BSC; not shown), which may also control a number of further BTSs (also not shown), which in combination with a number of further BSCs and BTSs, may provide a large number of geographically distributed cells served by MSC 714.

When mobile telephone 112 associates with serving MSC 714 (e.g. by entering a cell served by MSC 714), serving MSC 714 informs home MSC 708, which in turn updates HLR 710 with the location of mobile telephone 112. In this way, HLR 710 is kept up to date with the most recent location of mobile phone 112. Additionally, any configuration data relating to mobile telephone 112 is copied into VLR 716. This allows calls placed by the circuit-switched client on mobile telephone 112 while being served by serving MSC 714 to be correctly handled according to the aforementioned configuration data.

Depending on the location of mobile telephone 112, home mobile network part 706 may also serve mobile telephone 112, in which case it will comprise the same network part as visited mobile network part 712.

According to embodiments, the client-shared telephony service is provided by associating one or more communication clients (including the packet-switched communication client on mobile telephone 112) with a telephone dialling number associated with the circuit-switched communication client on mobile telephony device 112, such as its MSISDN. This can be referred to as twinning the additional communication clients with the circuit-switched communication client. According to such embodiments, the multiple communication client shared dialling number is therefore the MSISDN of the circuit-switched communication client on mobile telephony device 112.

A communication session between a communication client on one of the user's devices 108 and a communication client on a device of a remote party 126 is routed between the remote party device 126 and home mobile network part 706 via one or more further network parts (not shown). In some embodiments, remote party device 126 is also a mobile telephone, in which case the communication session may be routed via one or more serving mobile network parts and home mobile network parts associated with the remote party device. These could be the same as mobile network parts 706 and/or 712, or further mobile network parts (not shown). In other embodiments, remote party device 126 is a fixed line circuit-switched telephone, such as a POTS telephone, in which case the communication session may be routed via the PSTN and one or more gateway entities, such as a gateway MSC, to convert between the various protocols and data formats used to transfer media data and signalling data in the PSTN and mobile telephony network part 102a. Home MSC 708 may fulfil the role of the gateway entity, or it may be fulfilled by another intermediate entity. In further alternative embodiments, remote party device 126 is an IP telephony device, such as SIP telephone, in which case the communication session may be routed via an IP network, such as the Internet, and one or more gateway entities. Again, home MSC 708 may fulfil the role of the gateway entity, or it may be fulfilled by another intermediate entity.

A communication session between a communication client on one of the user's devices 108 and a communication client on remote party device 126 can be routed between mobile telephony network part 102a and call control system 106 via link 122, which could be, for example, a SIP trunk, or other high capacity communications link. In the embodiments shown in FIG. 7, home MSC 708 is shown as being the gateway entity between mobile network part 102a and call control system 106, however, this role could equally be performed by another entity in mobile network part 102a, such as serving MSC 714. Further, the links between IP network part 104a, call control system 106 and mobile telephony network part 102a may comprise one or more gateway or session border controller entities (not shown) which carry out conversion between the various protocols and data formats used to transfer media data and signalling data in the different networks making up telecommunications network 100.

In order to provide the client-shared telephony service, mobile telephony network part 102a is configured to route communication session setup, signalling and or/media data relating to one of the user's devices 108 via call control system 106. This can be achieved by configuring HLR 710 with one or more trigger conditions for communication session data relating to the multiple communication client shared dialling number, such that data originating from or directed to that dialling number results in appropriate communication session signalling data being sent to call control system 106. According to some embodiments, this could be a routing query to establish where the communication session data should be routed.

In other embodiments, the communication session data itself may be routed to call control system 106, which then handles the sending of communication session data to any appropriate further entities. In such embodiments, communication session data transmitted from call control system 106 to the circuit switched client on mobile telephone 112 would be undesirably routed back to call control system 106 by mobile telephony network 102a if routed by conventional methods on the basis of the MSISDN of the circuit-switched client. There are several methods for overcoming this behaviour, for example, the transmitted data may include additional information to indicate that the triggers stored in HLR 710 should not be utilised, causing HLR 710 to return the location of the mobile telephone 112 instead of invoking the associated trigger. Alternatively, call control system may be adapted to query HLR 710 directly via a further interface (not shown) to obtain a temporary routing number (TRN) for communicating with the circuit-switched client on mobile telephone 112. Routing communications to the circuit-switched client on mobile telephone 112 via such a TRN would not invoke the triggers stored in HLR 710, as the multiple communication client shared dialling number is not used.

Call control system 106 comprises call control server 720, and user database 128. Call control server 718 is responsible for processing communication session data relating to the user, and is aided in doing so by user database 128. Call control system 106 may further comprise a media gateway controller, service platform, call agent, application server or softswitch and may perform other functions typically associated with such entities. The elements comprised by call control system 106 may be located within mobile telephony network part 102a and/or IP network part 104a, or one or more other networks (not shown).

Figure 8:
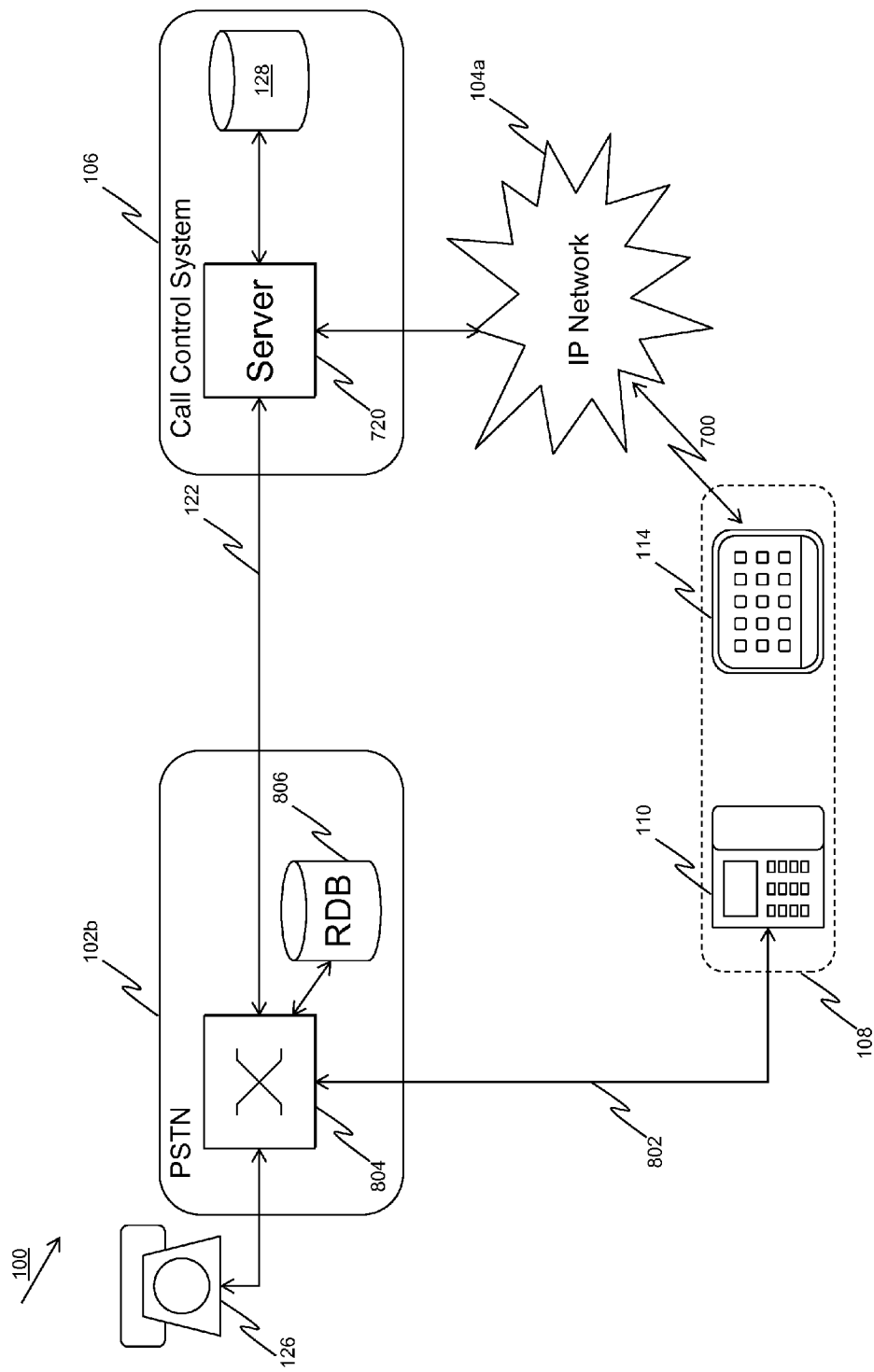
FIG. 8 shows telecommunications network depicted in FIG. 1 in more detail according to embodiments.

FIG. 8 shows telecommunications network 100 depicted in FIG. 1 in more detail according to embodiments; in such embodiments, circuit-switched network part 102 comprises a fixed line telephony network part 102b (such as the PSTN), and packet-switched network part 104 comprises IP network part 104a. A client-shared telephony service is hosted and controlled by a call control system 106, which comprises call control server 720 and user database 120, the functions of which are the same as described previously in relation to FIGS. 1 and 7.

Circuit-switched fixed line telephony network 102b comprises telephone switch 804 and routing database 806. Routing database 806 is queried by telephone switch 804 in order to establish how to route communication session data. As well as providing basic routing information, routing database 806 can be configured with a number of triggers in relation to certain calling or called parties. In embodiments of the present disclosure, routing database 806 is configured to route all communication session data either originating from, or directed to, one of the users devices 108 via call control system 106.

In the embodiment shown in FIG. 8, the user's communication devices 108 comprise desk phone 110 and tablet 114. Desk phone 110 is configured with a fixed-line circuit switched PSTN interface and a circuit switched communication client for conducting communications in telecommunications network 100 via fixed-line link 802 with PSTN network part 102b. Tablet 114 is equipped with a wireless packet-switched interface and a packet-switched client for communicating for conducting communications in telecommunications network 100 via radio link 700 with IP network part 104a. The packet-switched client on tablet 114 has been configured into the multiple client shared dialling number telephony service with respect to a telephone dialling number associated with the circuit-switched client on desk phone 110. Again, this can also be described by referring to the packet switched communication client on tablet 114 as having been twinned with the circuit switched client on desk phone 110.

Some embodiments described above relate to network and client functions that support the WiFi offload service to enable the service to make better decisions about access domain selection and voice call continuity, based on observation of the characteristics of media streams to and/or from a communication device. These observations may support an accurate estimation of actual or forecast voice media quality for both parties in a call connected over WiFi access, and this estimation of perceived voice quality may be used to drive decision making logic aimed at maximizing the overall quality of the customer experience.

Some embodiments described above relate to media quality testing, such as loopback media testing, initiated by a communication device 108. In such embodiments, the communication device 108 may be configured to initiate the media test, to perform some or all of the media test, for example by originating a loopback media stream, to measure characteristics of the returning media, and to make appropriate decisions about disposition of calls based on the results of the test. In some such embodiments, the call control system 106 is configured to detect SIP or other signalling from the communication device 108 requesting initiation of the media test, for example requesting the media loopback test, and to act on this signalling by looping back media for such test calls.

Some embodiments described above relate to media quality monitoring at the call control system 106. In some such embodiments, the call control system 106 monitors the characteristics of (at least) upstream media data, for example RTP streams, received from the communication device 108, compares the relevant statistics of the media data, in real time, with predetermined quality thresholds and transitions the call, for example via the circuit-switched network 102 and the packet-switched network 104, as necessary.

The above embodiments are to be understood as illustrative examples of the invention. Further embodiments of the invention are envisaged. For example:

Some embodiments have been described above in terms of selecting a media routing path for a voice call. However, other embodiments relate to video calling which, in general, is not conducted via a circuit switched network 102. In such other embodiments, the use of media quality testing, such loopback test media calls, is aimed at determining whether a video call can be established via the packet-switched network 104 with acceptable quality. If not, then the video call can be 'failed back' to a pure voice call—via the circuit-switched network 102 or via the packet-switched network 104.

In such embodiments, prior to initiating a video call, the communication device 108 may perform a media quality test, for example a loopback media test call, where the media test data characteristics are similar to the characteristics of the desired video media stream. If the results indicate unacceptable video quality, the call is initiated as voice only. Furthermore, in such embodiments, prior to accepting a terminating video call attempt, the communication device 108 may perform a media quality test, such as a loopback video media test call. If the results indicate unacceptable video quality, the communication device 108 may responds to a SIP INVITE for the video call with an SDP offer that includes audio media only. Finally, when a video call is currently in progress, the quality of video media is monitored by the communication device 108 and/or by the call control system 106 as described in relation to VCC above. If the call control system 106 detects poor video quality, it can react by re-negotiating the call as audio only.

In some embodiments described above, the call control system 106 remains on the media path for a call and monitors and analyses the media quality associated with media data that it is relaying. In some embodiments, one or more elements in the telecommunications network 100, 600 may remain on the media path and may transmit at least some of the media data it relays to one or more other elements in the telecommunications network 100, 600 that analyses the media data.

In embodiments described above, all calls involving a given user may be subject to TADS, OADS and/or VCC. However, on some occasions, it may be desired that certain calls in which the user is involved are not subject to one or more of TADS, OADS and/or VCC. For example, it may be desirable that originating calls to one or more predetermined parties, such as emergency services, are not subject to OADS, particularly where this may introduce delay into establishing the emergency call. Furthermore, it may be desirable and/or necessary that emergency calls only be conducted over a circuit-switched network 102, 602 and that WiFi offload not be offered for such calls. Such calls may be detected, for example, by identifying the one or more predetermined numbers in call signalling information for the call.

In some embodiments described above, a selection is made between a circuit-switched mobile access connection or a packet-switched access connection such as over WiFi. In an LTE network, there is no circuit-switched mobile access connection. Voice media data is transmitted over the LTE access network as VoIP. In this case, a communication device 108 having co-located communications clients can have two packet-switched interfaces, an LTE and a WiFi interface, and may have either two distinct packet switched communications clients (one for LTE and one for WiFi) or a single packet-switched communications client that may use either LTE or WiFi for access. Although some embodiments described above relate to transitioning between circuit-switched and packet-switched media routing paths, it will be appreciated that, in some cases, the transition may be between two (or more) circuit-switched media routing paths or two (or more) packet-switched media routing paths, for example between a packet-switched path in LTE and a packet-switched path over WiFi. It will be appreciated that an LTE smartphone may also have a circuit-switched communications client to handle circuit-switched communications, for example in the case where neither LTE nor WiFi connectivity is available.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of routing an incoming call involving a calling party and a called party in a telecommunications network via a selected media routing path of a plurality of different media routing paths, each of the media routing paths being for communicating media data to, from, or to and from, at least one calling party device associated with the calling party and at least one called party communication device associated with the called party, the method comprising:
 a call control system in the telecommunications network receiving, from the at least one calling party device, a call setup request directed to the called party;
 the call control system receiving data derived from a media quality test procedure for a given media routing path prior to the call being established between the calling party and the called party, the media quality test procedure including media test data being communicated via the given media routing path and the media test data being analyzed to determine whether the given media routing path supports communication of media data associated with the call with an acceptable media quality; and
 the call control system selecting, prior to the call being established between the calling party and the called party, a preferred media routing path from the plurality of different media routing paths for said communicating media data associated with the call to, from, or to and from, one or more of the at least one called party communication devices on the basis of at least the received data derived from the media quality test procedure,
 wherein the media quality test procedure comprises a media loopback test being performed, and
 wherein the media loopback test comprises transmission and reception of a SIP INVITE message with Session Description Protocol (SDP) indicating a request for a loopback connection, and transmission and reception of a SIP OK message with an SDP offer identifying a loopback media port.

2. The method according to claim 1, wherein said selecting the given media routing path from the plurality of different media routing paths is based at least on pre-existing preferred media routing path selection data.

3. The method according to claim 1, wherein at least one of the plurality of different media routing paths includes a cellular access network.

4. The method according to claim 1, wherein at least one of the plurality of different media routing paths includes a circuit-switched network.

5. The method according to claim 1, wherein at least one of the plurality of different media routing paths includes a packet-switched network.

6. The method according to claim 1, further comprising the call control system performing the media quality test procedure.

7. The method according to claim 1, wherein the media quality test procedure is performed by one or more given called party communication devices of the at least one called party communication devices.

8. The method according to claim 7, further comprising transmitting one or more messages that are operable to cause the one or more given called party communication devices to perform the media quality test procedure for the given media routing path.

9. A method of controlling a communication device, in a telecommunications network comprising a plurality of different media routing paths, each of the media routing paths being for communicating media data associated with a call involving the communication device and at least one remote party device associated with a remote call party to, from, or to and from, one or more entities in the telecommunications network, the method comprising:
 detecting one or more predetermined triggers prior to originating the call, wherein the one or more predetermined triggers comprise expiry of a media quality test time period;
 initiating a media quality test procedure for a given media routing path prior to originating the call, the media quality test procedure including media test data being communicated via the given media routing path and the media test data being analyzed to determine whether the given media routing path supports communication of media data associated with the call with an acceptable media quality; and
 selecting, prior to the call being established between the communication device and the at least one remote party device, a preferred media routing path from the plurality of different media routing paths for communicating media data associated with the call on the basis of at least the media quality test procedure,
 wherein the media quality test procedure comprises a media loopback test being performed, and
 wherein the media loopback test comprises transmission and reception of a SIP INVITE message with Session Description Protocol (SDP) indicating a request for a loopback connection, and transmission and reception of a SIP OK message with an SDP offer identifying a loopback media port.

10. The method according to claim 9, further comprising initiating the media quality test procedure in response to detecting the one or more predetermined triggers.

11. The method according to claim 9, wherein the one or more predetermined triggers is associated with originating the call.

12. The method according to claim 9, wherein the one or more predetermined triggers includes an attempt to originate the call.

13. The method according to claim 9, wherein the one or more predetermined triggers includes activity that leads to a call origination attempt.

* * * * *